(12) United States Patent
Aiba et al.

(10) Patent No.: US 10,673,566 B2
(45) Date of Patent: Jun. 2, 2020

(54) DETERMINING DCI FORMAT

(71) Applicant: Sharp Laboratories of America, Inc., Camas, WA (US)

(72) Inventors: Tatsushi Aiba, Vancouver, WA (US); John Michael Kowalski, Vancouver, WA (US); Kai Ying, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/123,477

(22) Filed: Sep. 6, 2018

(65) Prior Publication Data
US 2019/0074929 A1 Mar. 7, 2019

Related U.S. Application Data

(63) Continuation of application No. PCT/US2018/049499, filed on Sep. 5, 2018.
(Continued)

(51) Int. Cl.
H04L 1/00 (2006.01)
H04W 72/04 (2009.01)
(Continued)

(52) U.S. Cl.
CPC .......... H04L 1/0061 (2013.01); H04L 1/0025 (2013.01); H04L 1/0028 (2013.01);
(Continued)

(58) Field of Classification Search
CPC ... H04L 1/0061; H04L 5/0055; H04L 1/1812; H04L 1/0025; H04L 1/0028;
(Continued)

(56) References Cited

U.S. PATENT DOCUMENTS 8,386,878 B2   2/2013 Pi et al.
2016/0173262 A1  6/2016 Davydov et al.
(Continued)

OTHER PUBLICATIONS

International Search Report and Written Opinion issued for PCT Application No. PCT/US2018/049499 dated Dec. 4, 2018.
(Continued)

*Primary Examiner* — Ian N Moore
*Assistant Examiner* — Latresa A McCallum
(74) *Attorney, Agent, or Firm* — Austin Rapp

(57) ABSTRACT

A UE is described that communicates with a base station apparatus on serving cells having a primary cell and one or more secondary cells. The UE includes receiving circuitry configured to receive, a RRC message including first information configuring a CGB based transmission for a PDSCH. The receiving circuitry is also configured to receive, a RRC message including second information configuring a maximum number of CBGs per transport block. The UE includes processing circuitry configured to determine the number of bits for CBG transmission information comprised in a first DCI format, wherein the first DCI format is used for scheduling of the PDSCH. In a case that the first information is configured, the number of bits for the CBG transmission information comprised in the first DCI format may be determined based on the second information.

12 Claims, 16 Drawing Sheets

Related U.S. Application Data

(60) Provisional application No. 62/555,480, filed on Sep. 7, 2017.

(51) Int. Cl.
*H04L 5/00* (2006.01)
*H04W 76/27* (2018.01)
*H04W 72/12* (2009.01)
*H04L 1/18* (2006.01)
*H04L 1/16* (2006.01)

(52) U.S. Cl.
CPC .......... *H04L 5/0055* (2013.01); *H04L 5/0091* (2013.01); *H04W 72/042* (2013.01); *H04W 72/1289* (2013.01); *H04W 76/27* (2018.02); *H04L 1/0075* (2013.01); *H04L 1/1614* (2013.01); *H04L 1/1812* (2013.01); *H04L 1/1854* (2013.01); *H04L 1/1896* (2013.01)

(58) Field of Classification Search
CPC ... H04L 5/0091; H04L 1/0075; H04L 1/1614; H04L 1/1854; H04L 1/1896; H04W 76/27; H04W 72/042; H04W 72/1289
See application file for complete search history.

(56) References Cited

U.S. PATENT DOCUMENTS

2019/0150122 A1* 5/2019 Ying ................... H04W 72/042
370/329
2019/0207734 A1* 7/2019 Yang ..................... H04L 1/0061

OTHER PUBLICATIONS

Apple Inc., "CBG-based (re)transmission for multiplexing eMBB and URLLC", 3GPP TSG-RAN WG1 NR#2, Prague, Czech, R1-1714093, Aug. 25, 2017.
Catt, "DL control signaling design for CBG-based operation", 3GPP TSG RAN WG1 Meeting #90, Prague, Czechia, R1-1712416, Aug. 25, 2017.
NTT Docomo, Inc., "DL control signalling for CBG-based (re)transmission", 3GPP TSG RAN WG1 Meeting #90, Prague, Czechia, R1-1713954, Aug. 25, 2017.
3GPP TS 36.211 V14.1.0, Evolved Universal Terrestrial Radio Access (E-UTRA); Physical channels and modulation (Release 14) Dec. 2016.
3GPP TS 36.213 V14.1.0, Evolved Universal Terrestrial Radio Access (E-UTRA); Physical layer procedures (Release 14) Dec. 2016.
3GPP TS 36321, V14.1.0, Evolved Universal Terrestrial Radio Access (E-UTRA); Medium Access Control (MAC); Protocol specification (Release 14) Dec. 2016.
3GPP TS 36331, V14.1.0, Evolved Universal Terrestrial Radio Access (E-UTRA); Radio Resource Control (RRC); Protocol specification (Release 14) Dec. 2016.

* cited by examiner

Supported Transmission Numerologies

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot

| | | Slot configuration | | | | |
|---|---|---|---|---|---|---|
| | | 0 | | | 1 | |
| $\mu$ | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 4 | 5 |
| ... | ... | ... |
| 27 | 6 | 25 |
| 28 | 6 | 26 |
| 29 | 2 | reserved |
| 30 | 4 | |
| 31 | 6 | |

FIG. 5

For example, for 1 $N_{PRB}$ 110, the TBS is given by the ($I_{TBS}$, $N_{PRB}$) entry.

| $I_{TBS}$ | $N_{PRB}$ | | | | | | | |
|---|---|---|---|---|---|---|---|---|
| | 1 | 2 | 3 | ... | 108 | 109 | 110 |
| 0 | 16 | 32 | 56 | ... | 2984 | 2984 | 3112 |
| 1 | 24 | 56 | 88 | ... | 4008 | 4008 | 4008 |
| 2 | 32 | 72 | 144 | ... | 4774 | 4968 | 4968 |
| 3 | 40 | 140 | 176 | ... | 6200 | 6456 | 6456 |
| 4 | 56 | 120 | 208 | ... | 7736 | 7736 | 7992 |
| 5 | 72 | 144 | 224 | ... | 9528 | 9528 | 9528 |
| ... | ... | ... | ... | ... | ... | ... | ... |
| 22 | 59256 | 59256 | 59256 | ... | 59256 | 59256 | 59256 |
| 23 | 61664 | 61664 | 63776 | ... | 61664 | 61664 | 63776 |
| 24 | 66592 | 66592 | 66592 | ... | 66592 | 66592 | 66592 |
| 25 | 68808 | 68808 | 71112 | ... | 68808 | 68808 | 71112 |
| 26 | 75376 | 75376 | 75376 | ... | 75376 | 75376 | 75376 |

DETERMINING DCI FORMAT

RELATED APPLICATIONS

This application is related to and claims priority from U.S. Provisional Patent Application No. 62/555,480, entitled "USER EQUIPMENTS, BASE STATIONS AND METHODS," filed on Sep. 7, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

FIG. 5 illustrates an example of a modulation and coding scheme (MCS) index;

DETAILED DESCRIPTION

Figure 1:
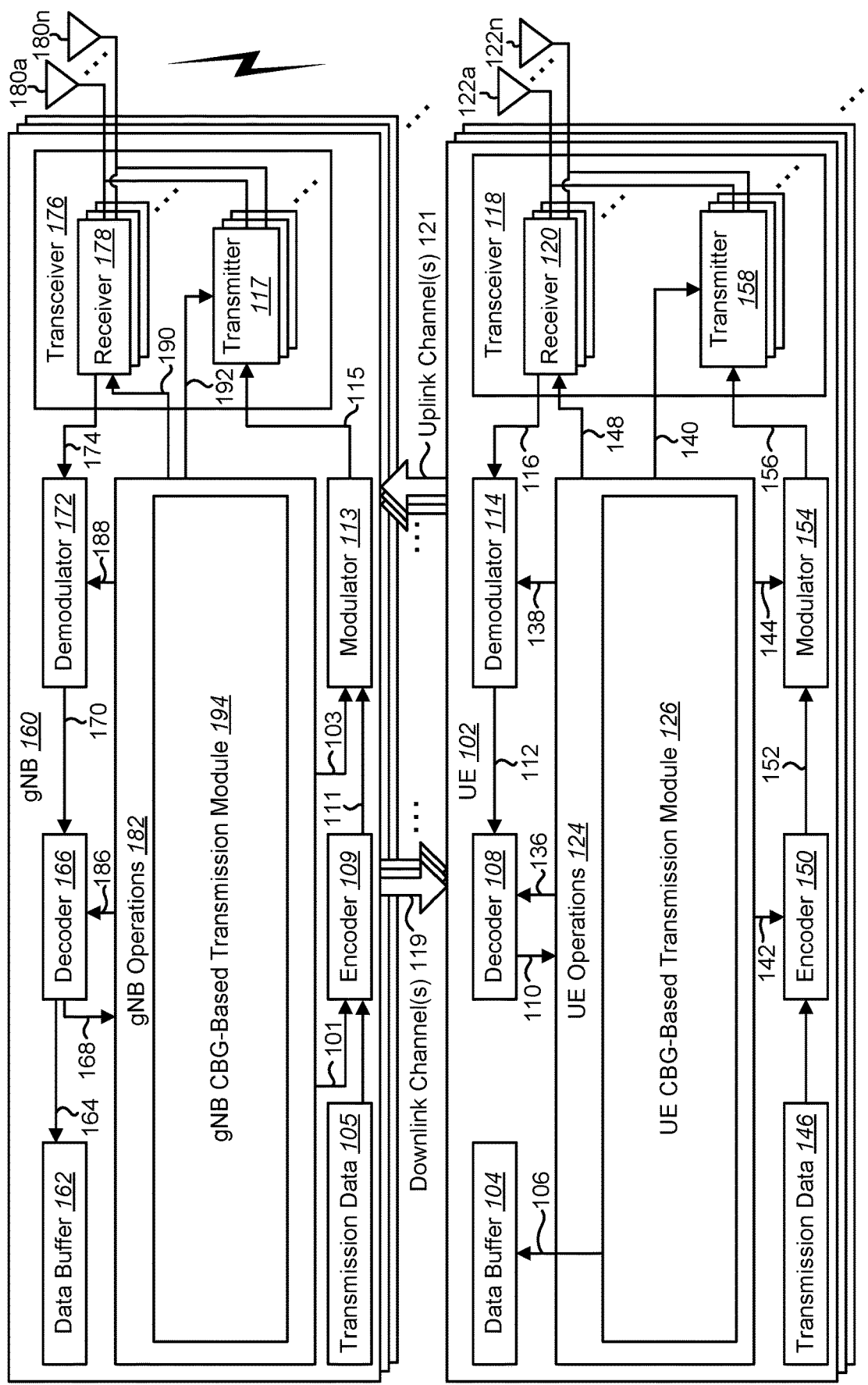
FIG. 1 is a block diagram illustrating one implementation of one or more base stations (gNBs) and one or more user equipments (UEs) in which systems and methods for downlink and/or uplink (re)transmissions may be implemented.

A user equipment (UE) is described that communicates with a base station apparatus on serving cells having a primary cell and one or more secondary cells. The UE includes receiving circuitry configured to receive, a radio resource control (RRC) message including first information configuring a code block group (CGB) based transmission for a physical downlink shared channel (PDSCH). The receiving circuitry is also configured to receive, a RRC message including second information configuring a maximum number of CBGs per transport block. The UE further includes processing circuitry configured to determine the number of bits for CBG transmission information comprised in a first downlink control information (DCI) format, wherein the first DCI format is used for scheduling of the PDSCH.

In a case that the first information is configured, the number of bits for the CBG transmission information comprised in the first DCI format may be determined based on the second information. The first information and the second information may be configured for each of the primary cell and the one or more secondary cells.

A cyclic redundancy check (CRC) scrambled by a cell-radio network temporary identifier (C-RNTI) may be attached to the first DCI format.

The receiving circuitry may be configured to receive, a RRC message including third information configuring whether a CBG flush indicator is present in the first DCI format. In a case that the CBG flush indicator is present in the first DCI format, the number of the CBG flush indicator may always be 1 bit.

The UE may further include transmitting circuitry configured to transmit, hybrid automatic repeat request-acknowledgment (HARQ-ACK) for the CBG based transmission for the PDSCH scheduled by using the first DCI format. The receiving circuitry may be configured to receive, a RRC message comprising third information configuring a second DCI format used for scheduling of the PDSCH. In a case that the PDSCH scheduled by using the second DCI format is received, the transmitting circuitry may be configured to transmit, HARQ-ACK only for a transport block.

The receiving circuitry may be configured to receive, a radio resource control (RRC) message having third information configuring a code block group (CGB) based transmission for a physical up shared channel (PUSCH). The receiving circuitry may be configured to receive, a RRC message having fourth information configuring a maximum number of CBGs per transport block. The processing circuitry may be configured to determine the number of bits for CBG transmission information comprised in a third DCI format, the third DCI format being used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

A base station apparatus is described that communicates with a user equipment (UE) on serving cells having a primary cell and one or more secondary cells. The base station includes transmitting circuitry configured to transmit, a radio resource control (RRC) message having first information configuring a code block group (CGB) based transmission for a physical downlink shared channel (PDSCH). The transmitting circuitry may be configured to transmit, a RRC message having second information configuring a maximum number of CBGs per transport block. The base station may also include processing circuitry configured to determine the number of bits for CBG transmission information comprised in a first downlink control information (DCI) format, wherein the first DCI format may be used for scheduling of the PDSCH. In a case that the first information is configured, the number of bits for the CBG transmission information comprised in the first DCI format may be determined based on the second information. The first information and the second information may be configured for each of the primary cell and the one or more secondary cells. Cyclic redundancy check (CRC) scrambled by a cell-radio network temporary identifier (C-RNTI) may be attached to the first DCI format.

The transmitting circuitry may be configured to transmit, a RRC message including third information configuring whether a CBG flush indicator is present in the first DCI format. In a case that the CBG flush indicator is present in the first DCI format, the number of the CBG flush indicator may always be 1 bit.

The base station may further include receiving circuitry configured to receive hybrid automatic repeat request-acknowledgment (HARQ-ACK) for the CBG based transmission for the PDSCH scheduled by using the first DCI format. The transmitting circuitry may be configured to transmit a RRC message having third information configuring a second DCI format used for scheduling of the PDSCH. In a case that the PDSCH scheduled by using the second DCI format is transmitted, the receiving circuitry may be configured to receive HARQ-ACK only for a transport block.

The transmitting circuitry may be configured to transmit a radio resource control (RRC) message having third information configuring a code block group (CGB) based transmission for a physical up shared channel (PUSCH). The transmitting circuitry may be configured to transmit a RRC message comprising fourth information configuring a maximum number of CBGs per transport block. The processing circuitry may be configured to determine the number of bits for CBG transmission information comprised in a third DCI format, wherein the third DCI format may be used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

A communication method is also described of a user equipment that communicates with a base station apparatus on serving cells having a primary cell and one or more secondary cells. A radio resource control (RRC) message is received having first information configuring a code block group (CGB) based transmission for a physical downlink shared channel (PDSCH). A RRC message is received having second information configuring a maximum number of CBGs per transport block. The number of bits is determined for CBG transmission information comprised in a first downlink control information (DCI) format, wherein the first DCI format may be used for scheduling of the PDSCH. In a case that the first information is configured, the number of bits for the CBG transmission information comprised in the first DCI format may be determined based on the second information. The first information and the second information may be configured for each of the primary cell and the one or more secondary cells. Cyclic redundancy check (CRC) scrambled by a cell-radio network temporary identifier (C-RNTI) may be attached to the first DCI format.

A RRC message may be receiving having third information configuring whether a CBG flush indicator is present in the first DCI format. In a case that the CBG flush indicator is present in the first DCI format, the number of the CBG flush indicator may always be 1 bit.

The method may further include transmitting hybrid automatic repeat request-acknowledgment (HARQ-ACK) for the CBG based transmission for the PDSCH scheduled by using the first DCI format, and receiving a RRC message comprising third information configuring a second DCI format used for scheduling of the PDSCH. In a case that the PDSCH scheduled by using the second DCI format is received, the transmitting circuitry may be configured to transmit HARQ-ACK only for a transport block.

The communication method may further include receiving a radio resource control (RRC) message including third information configuring a code block group (CGB) based transmission for a physical up shared channel (PUSCH). A RRC message may be received having fourth information configuring a maximum number of CBGs per transport block. The number of bits may be determined for CBG transmission information comprised in a third DCI format, wherein the third DCI format may be used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

A communication method is described of a base station apparatus that communicates with a user equipment (UE) on serving cells having a primary cell and one or more secondary cells. A radio resource control (RRC) message is transmitted having first information configuring a code block group (CGB) based transmission for a physical downlink shared channel (PDSCH). A RRC message is transmitted having second information configuring a maximum number of CBGs per transport block. The number of bits is determined for CBG transmission information comprised in a first downlink control information (DCI) format, wherein the first DCI format may be used for scheduling of the PDSCH. In a case that the first information is configured, the number of bits for the CBG transmission information comprised in the first DCI format may be determined based on the second information. The first information and the second information may be configured for each of the primary cell and the one or more secondary cells. Cyclic redundancy check (CRC) scrambled by a cell-radio network temporary identifier (C-RNTI) may be attached to the first DCI format.

A RRC message may be transmitted having third information configuring whether a CBG flush indicator is present in the first DCI format. In a case that the CBG flush indicator is present in the first DCI format, the number of the CBG flush indicator may always be 1 bit.

A hybrid automatic repeat request-acknowledgment (HARQ-ACK) may be received for the CBG based transmission for the PDSCH scheduled by using the first DCI format. A RRC message may be transmitted having third information configuring a second DCI format used for scheduling of the PDSCH. In a case that the PDSCH scheduled by using the second DCI format is transmitted, the receiving circuitry may be configured to receive HARQ-ACK only for a transport block.

The communication method may further include transmitting a radio resource control (RRC) message having third information configuring a code block group (CGB) based transmission for a physical up shared channel (PUSCH). The method may include transmitting a RRC message including fourth information configuring a maximum number of CBGs per transport block. The number of bits may be determined for CBG transmission information comprised in a third DCI format, wherein the third DCI format may be used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission and eMTC (massive Machine Type Communication) transmission. Also, in NR, one or more code block groups (CBGs)-based downlink and/or uplink (re)transmissions may be specified.

In order for the services to use the time, frequency, and/or space resources efficiently, it would be useful to be able to efficiently control downlink and/or uplink (re)transmissions. Therefore, a procedure for efficient control of downlink and/or uplink (re)transmissions should be designed. However, the detailed design of a procedure for downlink and/or uplink (re)transmissions has not been studied yet.

In some approaches, a UE may receive a radio resource control (RRC) message including information used for configuring more than one value of the maximum number of code block group(s) (CBG(s) per transport block (TB)). Also, the UE may receive a first downlink control information format (a first DCI format) used for scheduling of a physical downlink shared channel (PDSCH) transmission, including first information. Also, the UE may receive a second downlink control information format (a second DCI format) used for scheduling of a physical downlink shared channel (PDSCH) transmission, including, second information. Here, the first information and the second information may be used to determine a size of the TB. Also, the TB transmitted on the PDSCH may include of code block(s), and the PDSCH transmission(s) may include the CBG(s) transmission(s).

Here, for example, the number of CBG(s) in the TB may be defined by using the formula min(C, N), where C is the number of CB(s) within the TB. In a first case that the size of the TB is determined based on the first information and the size of the TB is smaller than a predetermined size, N is a first value of the more than one values of the maximum number of CBG(s) per TB. In a second case that the size of the TB is determined based on the second information and the size of the TB is equal to or greater than the predetermined value, N is a second value of the more than one values of the maximum number of CBG(s) per TB.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and/or uplink (re)transmissions may be implemented. The one or more UEs 102 communicate with one or more gNBs 160 using one or more physical antennas 122*a*-*n*. For example, a UE 102 transmits electromagnetic signals to the gNB 160 and receives electromagnetic signals from the gNB 160 using the one or more physical antennas 122*a*-*n*. The gNB 160 communicates with the UE 102 using one or more physical antennas 180*a*-*n*. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a*-*n*. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a*-*n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE CBG-based transmission module 126.

The UE CBG-based transmission module 126 may perform uplink transmissions. The uplink transmissions include data transmission and/or uplink reference signal transmission.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. For instance, the PRACH may be used for a random access preamble (e.g., a message 1 (Msg.1)). In some approaches, the PRACH may be used for an initial access connection establishment procedure, a handover procedure, a connection re-establishment, a timing adjustment (e.g., a synchronization for an uplink transmission) and/or for requesting an uplink shared channel (UL-SCH) resource (e.g., the uplink PSCH (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI) and/or Scheduling Request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel. Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block (TB(s)) and/or a MAC PDU may be defined as a unit(s) of the transport channel used in the MAC layer. For example, control, management, and/or process of HARQ may be performed, in the MAC layer, per the transport block. The transport block may be defined as a unit of data delivered from the MAC layer to the physical layer. The MAC layer may deliver the transport block to the physical layer (i.e., the MAC layer delivers the data as the transport block to the physical layer). In the physical layer, the transport block may be mapped to one or more codewords. For example, process of modulation, coding, construction of CBG(s) may be performed, in the physical layer, per a codeword. Namely, CBG(s) related process may be performed, in the physical layer, per a codeword.

The systems and methods herein are described for a case of a single codewode. Namely, the following descriptions may be applied for a single codeword case. However, the described systems and methods may be applied to a case of multiple codewords. For example, in a case of multiple codewords, the process described herein may be applied per codeword.

In downlink, the PCCH (e.g., Physical Downlink Control Channel (PDCCH)) may be used for transmitting Downlink Control Information (DCI). Here, more than one DCI format may be defined for DCI transmission on the PCCH. Namely, fields may be defined in the DCI format, and the fields are mapped to the information bits (e.g., DCI bits).

For example, a DCI format 1, a DCI format 1A, a DCI format X, and/or a DCI format Y that are used for scheduling of one physical shared channel (PSCH) (e.g., one PDSCH, one PDSCH codeword, transmission of one downlink transport block) in a cell is defined as the DCI format for the downlink. Also, a DCI format 2, a DCI format 2B, a DCI format K, and/or a DCI format L that are used for scheduling of one physical shared channel (PSCH) (e.g., one PDSCH, up to two PDSCH codewords, transmission of one downlink transport block) in a cell is defined as the DCI format for the downlink. Here, the DCI format 1, the DCI format 1A, the DCI format X, and/or the DCI format Y, the DCI format 2, the DCI format 2B, the DCI format K, and/or the DCI format L described herein may be assumed to be included in a DCI format A in some implementations for the sake of simplifying description. As described above, the DCI format A may be used for scheduling of PSCH (e.g., PDSCH). Namely, the DCI format A may be scheduling DCI. Also, the control resource set (i.e., CORESET) of the DCI format A may be used to schedule the PSCH (e.g., the PDSCH).

In an example, the DCI format A may include information on resource block assignment (resource allocation information). Namely, the DCI format A may include information used for indicating a physical resource block(s) of PDSCH. Also, the DCI format A may include information on a modulation and coding scheme (MCS). Also, the DCI format A may include information (a new data indicator) used for indicating whether a transmission is a new transmission or not (e.g., retransmission). Also, the DCI format A may include information on a transmission power control (TPC) command for PCCH. Also, the DCI format A may include code block group transmission information (i.e., CBGTI). Also, the DCI format A may include code block group flushing out information (i.e., CBGFI). The CBGTI may include information on which CBG(s) is/are (re)transmitted. Also, the CBGFI may include information on which CBG(s) is/are handled differently for soft-buffer and/or HARQ combining. Namely, a field(s) of the CBGTI may be defined in the DCI format A, and the field(s) of the CBGTI are mapped to the information bits. Also, a field(s) of the CBGFI may be defined in the DCI format A, and the field(s) of the CBGFI are mapped to the information bits.

Here, for example, cyclic redundancy check (CRC) parity bits may be attached to the DCI format A (i.e., DCI), and, after attachment, the CRC parity bits may be scrambled by a RNTI. Namely, the UE 102 may decode (detect, monitor) the DCI format A to which the CRC parity bits scrambled by the RNTI are attached (i.e., the DCI format A with the RNTI). Here, as described below, the UE 102 may decode the DCI format A with a PI C-RNTI (Preemption Indication C-RNTI). Also, the UE 102 may detect the DCI format A in the USS (i.e., the CORESET of a USS (i.e., a UE-specific search space)) and/or a CSS (i.e., the CORESET of a CSS (i.e., a common search space)).

Also, for example, a DCI format 0, a DCI format 6, a DCI format M, and/or a DCI format N that are used for scheduling of one PSCH (e.g., one PUSCH, one PUSCH codeword, transmission of one uplink transport block) in a cell is defined as the DCI format for the uplink. Also, a DCI format 4, a DCI format 4B, a DCI format P, and/or the DCI format Q that are used for scheduling of one PSCH (e.g., one PUSCH, up to two PUCH codewords, transmission of one uplink transport block) in a cell is defined as the DCI format for the uplink. Here, the DCI format 0, the DCI format 6, the DCI format M, the DCI format N, the DCI format 4, the DCI format 4B, the DCI format P, and/or the DCI format Q described herein may be assumed to be included in a DCI format B in some implementations for the sake of simple descriptions. As described above, the DCI format B may be used for scheduling of PSCH (e.g., PUSCH). Namely, the DCI format B may be scheduling DCI. Also, the control resource set (i.e., the CORESET) of the DCI format B may be used to schedule the PSCH (e.g., the PUSCH).

For example, the DCI format B may include information on resource block assignment (resource allocation information). Namely, the DCI format B may include information used for indicating a physical resource block(s) of PUSCH. Also, the DCI format B may include information on a modulation and coding scheme (MCS). Also, the DCI format B may include information (a new data indicator) used for indicating whether a transmission is new transmission or not (e.g., retransmission). Also, the DCI format B may include information on a transmission power control (TPC) command for PSCH (e.g., the PUSCH). Also, the DCI format B may include the CBGTI. Also, the DCI format B may include the CBGFI. Namely, a field(s) of the CBGTI may be defined in the DCI format B. The field(s) of the CBGTI are mapped to the information bits. Also, a field(s) of the CBGFI may be defined in the DCI format B. The field(s) of the CBGFI are mapped to the information bits.

Also, for example, cyclic redundancy check (CRC) parity bits may be attached to the DCI format B (i.e., DCI), and, after attachment, the CRC parity bits may be scrambled by the RNTI. Namely, the UE 102 may decode (detect, monitor) the DCI format B to which the CRC parity bits scrambled by the RNTI are attached (i.e., the DCI format B with the RNTI). Here, as described below, the UE 102 may decode the DCI format B with a PI C-RNTI (Preemption Indication C-RNTI). Also, the UE 102 may detect the DCI format B in the USS (i.e., the CORESET of the USS) and/or the CSS (i.e., the CORESET of the CSS).

Also, a DCI format C that includes information used for indicating which resources (e.g., DL physical resources, UL physical resources) has been preempted is defined as the DCI format for the downlink and/or the uplink. Here, the information used for indicating which resources (e.g., DL physical resources, UL physical resources) have been preempted may be considered as a preemption indication. Namely, the preemption indication may be transmitted on the PDCCH. Also, the preemption indication may not be included in the DCI format A, and the DCI format B. Namely, the preemption indication may not be included in the scheduling DCI (i.e., the DCI that schedules the (re) transmission of the DL data transmission, and/or UL data transmission). Also, the resources indicated by using the preemption indication may include a time resource(s) and/or a frequency resource(s). Namely, the CBGTI and/or the CBGFI may be considered as the preemption indication. Also, the DCI format C may include the CBGTI. Also, the DCI format C may include the CBGFI. Namely, a field(s) of the preemption indication may be defined in the DCI format C. The field(s) of the preemption indication are mapped to the information bits. Also, a field(s) of the CBGTI may be defined in the DCI format C. The field(s) of the CBGTI are mapped to the information bits. Also, a field(s) of the CBGFI may be defined in the DCI format C. The field(s) of the CBGFI are mapped to the information bits.

Also, for example, cyclic redundancy check (CRC) parity bits may be attached to the DCI format C (i.e., DCI), and, after attachment, the CRC parity bits may be scrambled by the PI C-RNTI. Namely, the UE 102 may decode (detect, monitor) the DCI format C to which the CRC parity bits scrambled by the PI C-RNTI are attached (i.e., the DCI format C with the PI C-RNTI). Different RNTI(s) may be defined for transmission(s) (i.e., reception(s), detection(s), the scrambling(s) of CRC parity bits) for the scheduling DCI and the DCI format C. Here, the UE 102 may decode the DCI format C with the C-RNTI. Also, the UE 102 may detect the DCI format C only in the CSS (i.e., the CORESET of the CSS). Namely, the DCI format C may be a group common DCI format (i.e., a common DCI format for a plurality of UEs 102). Here, the UE 102 may detect the DCI format 1C in the USS (i.e., the CORESET of the USS) and/or the CSS (i.e., the CORESET of the CSS).

Here, in a case that the preemption indication is used for the PSCH transmission (e.g., the PDSCH transmission and/or the PUSCH transmission), the CBGTI and/or the CBGFI may not be used for the PSCH transmission. Namely, for example, in the case that the preemption indication is used for the PSCH transmission, the UE 102 may assume the CBGTI (the field(s) of the CBGTI) and/or the CBGFI (the field(s) of the CBGFI) is not present in the DCI format (e.g., the DCI format A, the DCI format B, and/or the DCI format C). Also, in a case that the CBGTI and/or the CBGFI is used for the PSCH transmission, the preemption indication may not be used for the PSCH transmission. Namely, for example, only the preemption indication and the CBGTI may be sufficient for the PDSCH transmission (e.g., an indication of CBG(s)-based transmission). Namely, for example, only the preemption indication and the CBGTI may be sufficient for soft-buffer and/or HARQ combining (i.e., for the PDSCH transmission).

Here, for example, the gNB 160 may configure, e.g., by using the RRC message, whether the preemption indication (the field(s) of the preemption indication) is present or not in the DCI format (e.g., the DCI format C). And, as described above, in a case that the presence of the preemption indication is configured, the UE 102 may assume the CBGTI and/or the CBGFI is not present in the DCI format (e.g., the DCI format A, the DCI format B, and/or the DCI format C). Also, in a case that the presence of the preemption indication is not configured, the UE 102 may assume the CBGTI and/or the CBGFI is present in the DCI format (e.g., the DCI format A, the DCI format B, and/or the DCI format C).

Also, the gNB 160 may configure, e.g., by using the RRC message, whether the CBGTI (e.g., the field of the CBGTI) and/or the CBGFI (e.g., the field of the CBGFI) is present or not in the DCI format (e.g., the DCI format A, the DCI format B, and/or the DCI format C). And, as described above, in a case that the presence of the CBGTI and/or the CBGFI is configured, the UE may assume the preemption indication is not present in the DCI format (e.g., the DCI format C). For example, in the case that the presence of the CBGTI and/or the CBGFI is configured, the UE may not monitor the DCI format C. Also, in a case that the presence of the CBGTI and/or the CBGFI is not configured, the UE 102 may assume the preemption indication is present in the DCI format (e.g., the DCI format C). For example, in the case that the presence of the CBGTI and/or the CBGFI is not configured, the UE 102 may monitor the DCI format C.

As described below, the USS may be determined (i.e., given) based on the Radio Network Temporary Identifier (i.e., the RNTI) (e.g., the C-RNTI and/or the PI C-RNTI). Namely, the UE 102 may detect (i.e., monitor), in the USS given by at least the C-RNTI, the DCI format C to which the CRC party bits scramble by the PI C-RNTI are attached. Also, the UE 102 may detect (i.e., monitor), in the USS given by at least the PI C-RNTI, the DCI format C to which the CRC party bits scramble by the PI C-RNTI are attached. Here, the gNB 160 may configure, e.g., by using the RRC message, the control resource set (i.e., the CORESET) of USS in which the UE 102 detects (i.e., monitors) the DCI format C to which the CRC parity is scrambled by the PI C-RNTI are attached. The UE 102 may detect (monitor), in the USS that is configured by the gNB 160, the DCI format C to which the CRC parity bits scrambled by the PI C-RNTI are attached.

Also, for example, PSCH may be defined. For example, in a case that the downlink PSCH resource (e.g., the PDSCH resource) is scheduled by using the DCI format A, the UE 102 may receive the downlink data, on the scheduled downlink PSCH resource (e.g., the PDSCH resource). Also, in a case that the uplink PSCH resource (e.g., the PUSCH resource) is scheduled by using the DCI format B, the UE 102 transmits the uplink data, on the scheduled uplink PSCH resource (e.g., the PUSCH resource). Namely, the downlink PSCH may be used to transmit the downlink data. And, the uplink PSCH may be used to transmit the uplink data.

Furthermore, the downlink PSCH (e.g., the PDSCH) and the uplink PSCH (e.g., the PUSCH) are used to transmit information of a higher layer (e.g., a Radio Resource Control (RRC)) layer and/or a MAC layer). For example, the downlink PSCH and the uplink PSCH are used to transmit a RRC message (a RRC signal) and/or a MAC Control Element (a MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

In some approaches, the downlink PSCH (e.g., the PDSCH) may be used for transmitting (e.g., notifying, specifying, identifying, etc.) a random access response. For example, the downlink PSCH (e.g., the PDSCH) may be scheduled by using the downlink PCH (e.g., the PDCCH) with RA-RNTI (Random Access RNTI (Radio Network Temporary Identifier)). For instance, the random access response grant may be used for scheduling of the uplink PSCH (e.g., the PUSCH, a Message 3 in a random access procedure (e.g., a contention based random access procedure)). The random access response grant may be delivered from the higher layer (e.g., the MAC layer) to the physical layer.

In some approaches, a PBCH (Physical Broadcast Channel, (e.g., Primary PBCH)) may be defined. For example, the PBCH may be used for broadcasting the MIB (Master Information Block). For instance, the MIB may be used by multiple UEs 102 and may include system information transmitted on the BCH (Broadcast Channel). Also, the MIB may include information (e.g., an information block) for configuring a Secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (System Frame Number).

The system information may be divided into the MIB and a number of SIB(s) (System Information Block(s)). The MIB may include a limited number of most essential and/or most frequently transmitted information (e.g., parameter(s)) that are needed to acquire other information from the cell. Namely, the PBCH (e.g., MIB) may include minimum system information. Also, the SIB(s) may be carried in a System Information message. For example, the SIB(s) may be transmitted on the Secondary PBCH and/or the downlink PSCH (e.g., the PDSCH). The SIB(s) may include remaining minimum system information. For example, the SIB(s) (e.g., System Information Block Type 2) may contain radio resource configuration information that is common for multiple UEs 102.

In some approaches, the SIB(s) may contain information for a random access channel configuration (e.g., a random access configuration for a preamble format) that is used for a random access procedure (e.g., a random access preamble transmission (Msg.1 transmission)). For example, the information for the random access configuration may include the preamble format, the SFN, a subframe number (e.g., a subframe number, a slot number and/or a symbol number). Also, a part of the information for the random access configuration may be included in the MIB (e.g., PBCH).

In some approaches, in downlink, a SS (Synchronization Signal) may be defined. The SS may be used for synchronizing downlink time-frequency (a time domain and/or a frequency domain). The SS may include a PSS (Primary Synchronization Signal). Additionally or alternatively, the SS may include a SSS (Secondary Synchronization Signal). Additionally or alternatively, the SS may include a TSS (Tertiary Synchronization Signal). For example, the PSS, the SSS, the TSS and/or the PBCH may be used for identifying a physical layer cell identity. Additionally or alternatively, the PSS, the SSS, the TSS and/or the PBCH may be used for identifying an identity for one or more beams, one or more TRPs and/or one or more antenna ports. Additionally or alternatively, the PSS, the SSS, TSS and/or the PBCH may be used for identifying an OFDM symbol index, a slot index in a radio frame and/or a radio frame number.

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) may include the demodulation reference signal(s) associated with transmission of the uplink physical channel (e.g., the PUSCH and/or the PUCCH).

Also, the UE-specific reference signal(s) may include reference signal(s) associated with transmission of uplink physical channel (e.g., the PUSCH and/or the PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

Also, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal(s) (the CSI-RS(s)). The UE-specific reference signal may include the UE-specific reference signal(s) associated with transmission of the downlink physical channel (e.g., the PDSCH and/or the PDCCH). Also, the demodulation reference signal(s) may include the demodulation reference signal(s) associated with transmission of the downlink physical channel (e.g., the PDSCH and/or the PDCCH). Also, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (i.e., a DL signal(s)) in some implementations for the sake of simple descriptions. Also, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB CBG-based transmission module 194. The gNB CBG-based transmission module 194 may perform CBG-based transmission as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 200. As shown in FIG. 2, multiple numerologies (i.e., multiple subcarrier spacing) may be supported. For example, μ (e.g., a subcarrier space configuration) and a cyclic prefix (e.g., the μ and the cyclic prefix for a carrier bandwidth part) may be configured by higher layer parameters (i.e., a RRC message) for the downlink and/or the uplink. Here, 15 kHz may be a reference numerology. For example, an RE of the reference numerology may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Also, a number of OFDM symbol(s) per slot $$(N_{symb}^{slot})$$

may be determined based on the μ (e.g., the subcarrier space configuration). Here, for example, a slot configuration 0 (i.e., the number of OFDM symbols per slot may be 14) and/or a slot configuration (i.e., the number of OFDM symbols per slot may be 7) may be defined.

Figure 3:
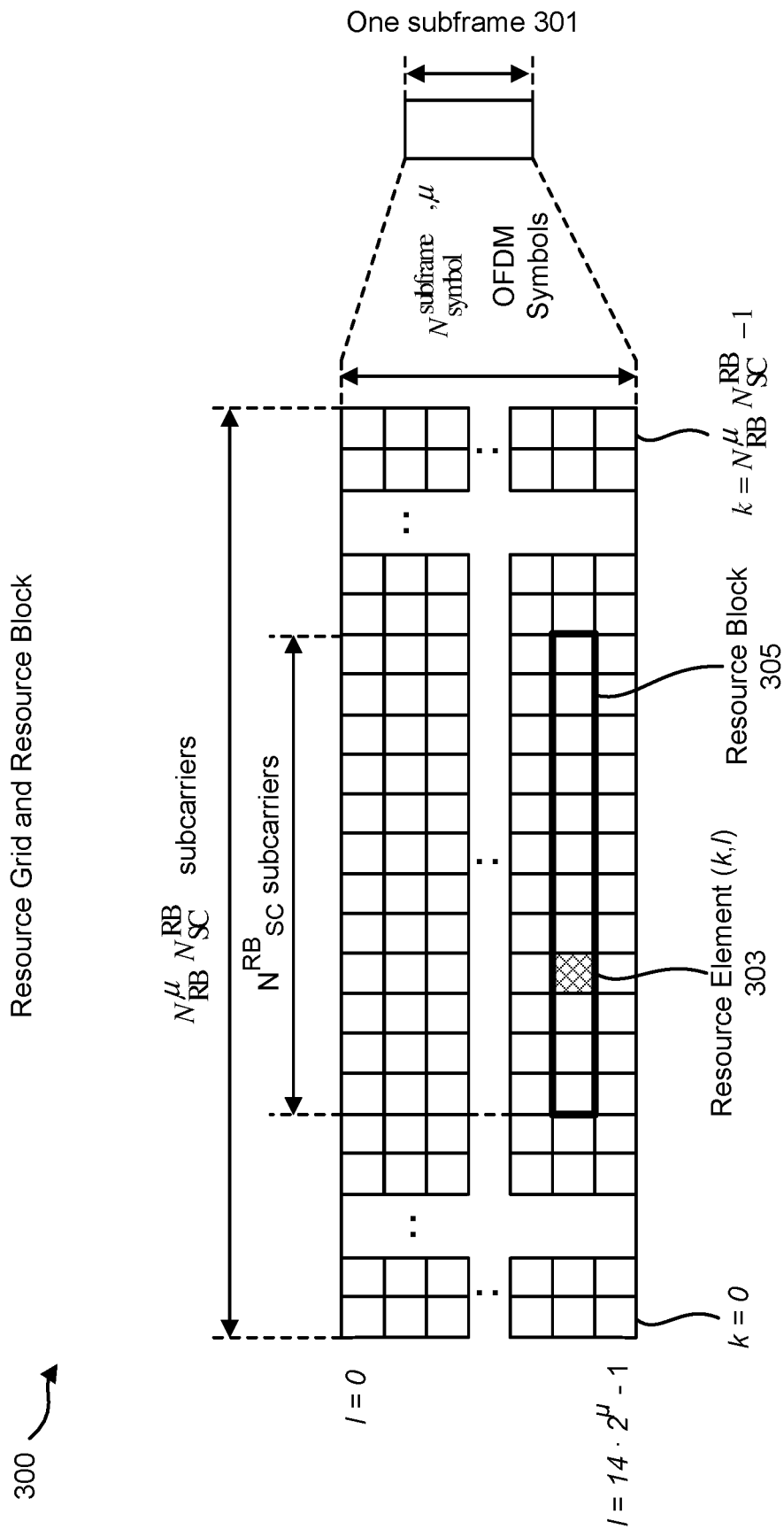
FIG. 3 is a diagram illustrating one example of a resource grid and resource block for the downlink and/or the uplink.

FIG. 3 is a diagram illustrating one example of a resource grid and resource block 300 (e.g., for the downlink and/or the uplink). The resource grid illustrated in FIG. 3 may be utilized in some implementations of the systems and methods disclosed herein.

In FIG. 3, one subframe 301 may include $N_{symbol}^{subframe,\mu}$ symbols. Also, a resource block may include a number of resource elements (RE) 303. Here, in the downlink, the OFDM access scheme with cyclic prefix (CP) may be employed, which may be also referred to as CP-OFDM. A downlink radio frame may include multiple pairs of downlink resource blocks (RBs) 305 which is also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. And, the downlink RB may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 303 and is uniquely identified by the index pair (k,l), where k and l are indices in the frequency and time domains, respectively.

Also, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k, l) in a slot, where k and l are indices in the frequency and time domains respectively.

Each element in the resource grid (e.g., antenna port p) and the subcarrier configuration μ is called a resource element and is uniquely identified by the index pair (k,l) where k=0, . . . , $N_{RB}^{\mu}N_{SC}^{RB}-1$ the in the frequency domain and l refers to the symbol position in the time domain. The resource element (k,l) on the antenna port p and the subcarrier spacing configuration μ is denoted $(k,l)_{p,\mu}$. The physical resource block is defined as $N_{SC}^{RB}=12$ consecutive subcarriers in the frequency domain. The physical resource blocks are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
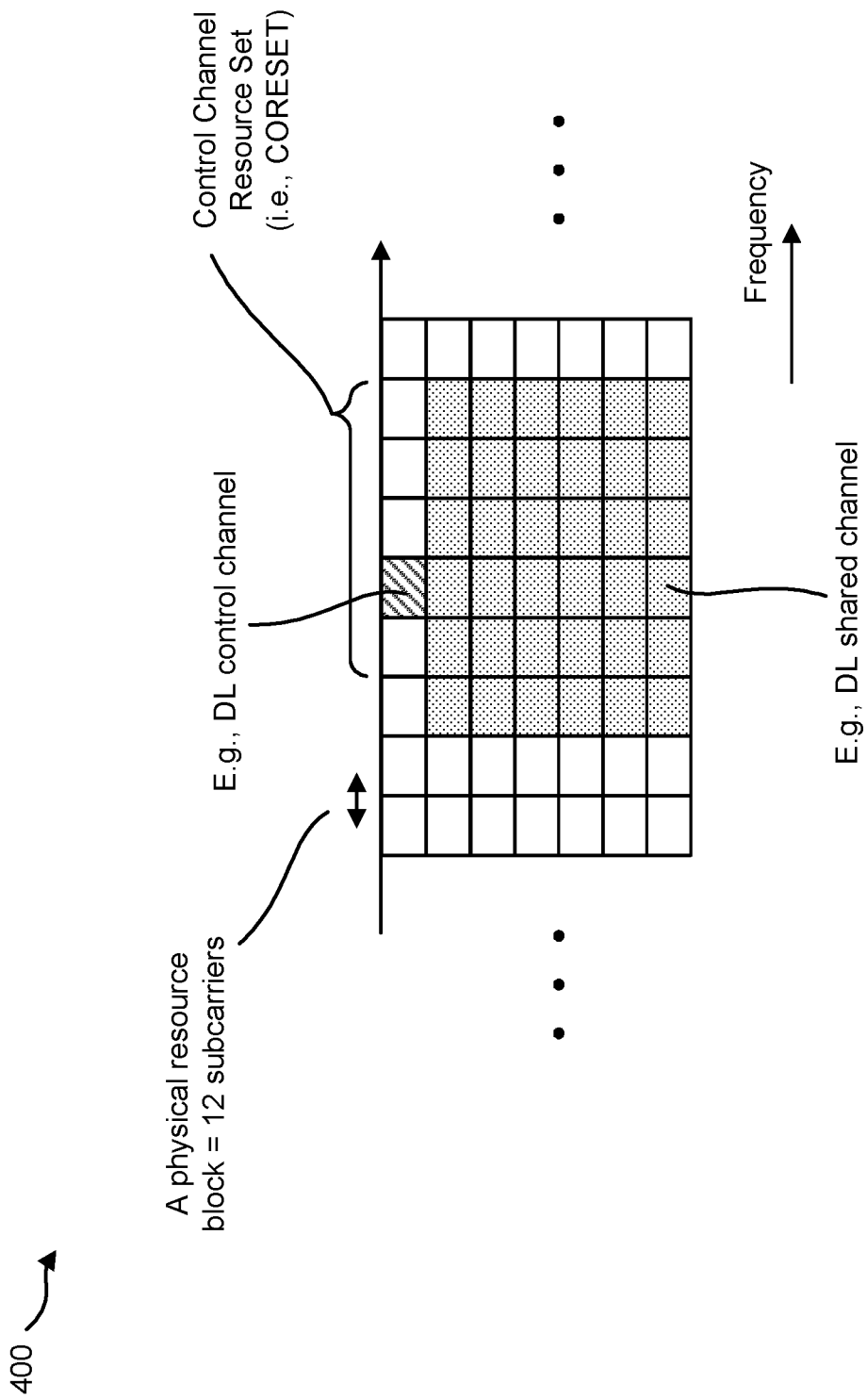
FIG. 4 shows examples of resource regions.

FIG. 4 shows examples of resource regions 400 (e.g., resource region of the downlink). One or more sets of PRB(s) (e.g., a control resource set (i.e., CORESET)) may be configured for DL control channel monitoring. For example, the control resource set (i.e., the CORESET) is, in the frequency domain and/or the time domain, a set of PRBs within which the UE 102 attempts to decode downlink control information (e.g., monitor downlink control information (DCI), blind decoding of downlink control information (DCI)), where the PRBs may or may not be frequency contiguous, a UE 102 may have one or more control resource sets (i.e., the CORESETs) and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

The UE 102 may monitor a set of candidates of the DL control channel(s) (e.g., the PCCH (e.g., the PDCCH)) in the control resource set (i.e., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). The term "monitor" means that the UE 102 attempts to decode each DL control channel(s) in the set of candidates of the DL control channel(s) in accordance with all the DCI format(s) to be monitored.

The set of candidates of the DL control channel(s) (e.g., the CORESET) which the UE 102 monitors may be also referred to as a search space (e.g., DL control channel set etc.). That is, the search space is a set of resource that may possibly be used for transmission of the DL control channel(s). The UE 102 may monitor a set of candidates of the DL control channel(s) in the control resource set (i.e., the CORESET) according to a search space where monitoring implies attempting to detect each DL control channel(s) candidate in the control resource set (i.e., the CORESET) according to the monitored DCI formats. Namely, the control resource set (i.e., the CORESET) may be used for scheduling of the PDSCH. Also, the control resource set may be used for scheduling of the PUSCH.

Here, a common search space (CSS) and/or a user-equipment search space (USS) are set (or defined, configured) in a region(s) of DL control channel(s) (e.g., the DL control channel monitoring regions). For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15. Also, the gNB 160 may configure, (by using the PBCH (e.g., the MIB), the PDSCH (i.e., the SIB), and/or the dedicated RRC message), the CSS (e.g., the region of the CSS, the control resource set of the CSS). Also, the gNB 160 may transmit, in the CSS, DCI format(s) to a plurality of the UEs 102. The sets of candidates of DL control channel(s) that the UE 102 monitors may be defined in terms of DL control channel(s) CSS. A DL control channel(s) CSS at CCE aggregation level may be defined by the set of candidates of the DL control channel(s).

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI and/or the PI C-RNTI), a slot number in a radio frame, an aggregation level, and/or the like. The RNTI(s) may be assigned by the gNB 160. Namely, each of the USSs corresponding to each of the RNTI(s) described below may be defined. Also, for example, the gNB 160 may configure (by using the PBCH (e.g., the MIB), the PDSCH (e.g., the SIN), and/or the dedicated RRC message), the USS (e.g., the region of the USS, the control resource set of the USS). Also, the gNB 160 may transmit, in the USS, DCI format(s) intended for a specific UE 102. The sets of candidates of DL control channel(s) that the UE 102 monitors may be defined in terms of DL control channel(s) USS. A DL control channel(s) USS at CCE aggregation level may be defined by the set of candidates of the DL control channel(s).

Here, the RNTI(s) may include C-RNTI (Cell-RNTI), SI-RNTI (System Information RNTI), P-RNTI (Paging RNTI), RA-RNTI (Random Access-RNTI), Temporary C-RNTI, and/or the PI C-RNTI (Preemption Indication C-RNTI). For example, the C-RNTI may be a unique identification used for identifying RRC connection and/or scheduling. The SI-RNTI may be used for identifying SI (i.e., SI message) mapped on the BCCH and dynamically carried on DL-SCH. The SI-RNTI may be used for broadcasting of SI. The P-RNTI may be used for transmission of Paging and/or SI change notification. The RA-RNTI may be an identification used for the random access procedure. The Temporary C-RNTI may be used for the random access procedure. The PI C-RNTI may be used for carrying the preemption indication (e.g., the CBGTI and/or the CBGFI).

Also, some types of C-RNTI (e.g., a first C-RNTI, and a second C-RNTI) may be specified. For example, a first C-RNTI may be a unique identification used for identifying RRC connection and/or scheduling of a first type of transmission (e.g., a first transmission scheme (e.g., a first PDSCH transmission scheme, and/or a first PUSCH transmission scheme), a first transmission mode (e.g., a first PDSCH transmission mode, and/or a first PUSCH transmission mode)). Also, a second C-RNTI may be a unique identification used for identifying RRC connection and/or scheduling of a second type of transmission (e.g., a second transmission scheme (e.g., a second PDSCH transmission scheme, and/or a second PUSCH transmission scheme), a second transmission mode (a second PDSCH transmission mode, and/or a second PUSCH transmission mode)). For example, a transmission time interval(s) (i.e., a duration of transmission in time) may be different between the first type of transmission and the second type of transmission. Also, for example, the first types of transmission (e.g., the PDSCH transmission) may be scheduled by using the DCI format 1 and/or the DCI format 1A. Also, the second types of transmission (e.g., the PDSCH transmission) may be scheduled by using the DCI format X and/or the DCI format Y. Also, the first types of transmission (e.g., the PUSCH transmission) may be scheduled by using the DCI format 0 and/or the DCI format 6. Also, the second types of transmission (e.g., the PUSCH transmission) may be scheduled by using the DCI format M and/or the DCI format N.

Each of the first type of transmissions may be scheduled by using each of DCI formats (i.e., the DCI formats A (e.g., the DCI format 1 and/or the DCI format 1A), and/or the DCI formats B (e.g., the DCI format 0 and/or the DCI format6)). Also, the second type of transmission may be periodic (i.e., one DCI format (i.e., one DCI format A (e.g., the DCI format X and/or the DCI format Y), and/or one DCI format B (the DCI format M and/or the DCI format N)) may be used for scheduling of the periodic transmission of the second type of transmission). Also, the second type of transmission may be repeated (i.e., a repetition of the second types of transmission may be applied (e.g., performed and/or configured)). For example, one DCI format (one DCI format A (e.g., the DCI format X and/or the DCI format Y), and/or one DCI format B (e.g., the DCI format M and/or the DCI format N)) may be used for scheduling of the second types of transmission that is repeated (e.g., k times repeated, k is configured/indicated by using the RRC message, the DCI format A (e.g., the DCI format X and/or the DCI format Y), and/or the DCI format B (e.g., the DCI format M and/or the DCI format N)). For example, the gNB 160 may configure, e.g., by using the RRC message, a periodicity used for the second types of transmission. Also, the gNB 160 may configure (e.g., by using the RRC message) the number (k) of repetition(s) used for the second types of transmission. And, the gNB 160 may indicate (e.g., activate) (e.g., by using the DCI format A (e.g., the DCI format X and/or the DCI format Y), and/or the DCI format B (e.g., the DCI format M and/or the DCI format N))) the second types of transmission.

For example, the some types of C-RNTI and/or the some types DCI format may be used for scheduling of transmission(s) for different services (e.g., eMBB, URLLC, and/or eMTC). The first C-RNTI may be a unique identification used for scheduling of transmission(s) on eMBB service. The DCI format 1 and/or the DCI format 1A may be used for scheduling of PDSCH transmission(s) on eMBB service. Also, the DCI format 0 and/or the DCI format 6 may be used for scheduling of PUSCH transmission(s) on eMBB service. Also, the second C-RNTI may be a unique identification used for scheduling of transmission(s) on URLLC service. The DCI format X and/or the DCI format Y may be used for scheduling of PDSCH transmission on URLLC service. Also, the DCI format M and/or the DCI format N may be used for scheduling of PUSCH transmission on URLLC service. Namely, for example, the first types of transmission may be the transmission (e.g., the PDSCH transmission and/or the PUSCH transmission) on eMBB service. Also, for example, the second types of transmission may be the transmission (e.g., the PDSCH transmission and/or the PUSCH transmission) on URLLC service. Also, the DCI format 1 with the first C-RNTI and/or the DCI format 1A with the first C-RNTI may be used for scheduling of PDSCH transmission on eMBB service. Also, the DCI format X with the second C-RNTI and/or the DCI format Y with the second C-RNTI may be used for scheduling of PDSCH transmission on URLLC service. Also, the DCI format 0 with the first C-RNTI and/or the DCI format 6 with the first C-RNTI may be used for scheduling of PUSCH transmission on eMBB service. Also, the DCI format M with the second C-RNTI and/or the DCI format N with the second C-RNTI may be used for scheduling of PUSCH transmission on URLLC service.

Here, the RNTI(s) assigned (e.g., by the gNB 160) to the UE 102 may be used for transmission of DCI (transmission of DL control channel(s)). Specifically, CRC (Cyclic Redundancy Check) parity bits (also referred to simply as CRC), which are generated based on DCI (or the DCI format, and/or the UL grant), are attached to DCI, and, after attachment, the CRC parity bits are scrambled by the RNTI(s). The UE 102 may attempt to decode DCI to which the CRC parity bits scrambled by the RNTI(s) are attached, and detects DL control channel (e.g., the PCCH (e.g., the PDCCH), the DCI, the DCI format). That is, the UE 102 may decode the DL control channel(s) with the CRC scrambled by the RNTI(s). In other words, the UE 102 may monitor the DL control channel(s) with the RNTI(s).

Here, as described above, the gNB 160 may transmit, (by using the PBCH (e.g., the MIB), the PDSCH (e.g., the SIB), and/or the dedicated RRC message), information used for configuring one or more control resource sets (i.e., one or more CORESETs) of the CSS and/or the USS. Also, the gNB 160 may transmit information used for configuring the occasion(s) of DL control channel(s) monitoring (the control resource set monitoring). Here, the DL control channel(s) may be the PCCH(s) (e.g., the PDCCH(s)). Here, the occasion(s) may correspond to a subframe, a slot, a sub-slot, and/or a symbol. Namely, the occasion(s) may correspond to a position(s) (e.g., a timing, a time resource, a time location, a time index, an index of the subframe(s), the slot(s), the sub-slot(s), and/or the symbol(s)).

FIG. 5 illustrates an example of an MCS index 500 (i.e., a modulation and coding scheme index). For example, the MCS index ($I_{MCS}$) may correspond to the information on the modulation and coding scheme that is included in the DCI format A. Namely, the UE 102 may determine the MCS index ($I_{MCS}$) based on a value(s) set to the information on the modulation and coding scheme. For example, the MCS index ($I_{MCS}$) may be used to determine a modulation order ($Q_m$). Also, the MCS index may be used to determine the TBS index ($I_{TBS}$). Here, as described below, the TBS index ($I_{TBS}$) may be used to determine the size of the TB. For example, according to the FIG. 5, the UE 102 may determine the modulation order ($Q_m$) and/or the TB size index ($I_{TBS}$) using the MCS index ($I_{MCS}$).

Figure 6:
FIG. 6 illustrates an example of a transport block (TB) size determination.

FIG. 6 illustrates an example of a TB size determination 600. For example, as described above, to determine the transport block(s) (e.g., in the PDSCH, and/or in the PUSCH), the UE 102 may read, firstly, the information on the modulation and coding scheme (i.e., the modulation and coding scheme field) in the DCI format A and/or the DCI format B. The UE 102 may determine the MCS index ($I_{MCS}$) based on the value(s) of the modulation and coding scheme field. Also, the UE 102 may determine (e.g., calculate), secondary, the total number of allocated PRBs ($N_{PRB}$) based on the information on the resource block assignment.

In an example, according to the FIG. 6, the TB size may be given by using the TBS index ($I_{TBS}$) and the total number of allocated PRBs ($N_{PRB}$). As described above, the information on the modulation and coding scheme and/or the information on resource block assignment may be included in the DCI format A and/or the DCI format B (i.e., the scheduling DCI). Namely, the UE 102 may determine the TB size based on the information included in the DCI format A and/or the DCI format B (i.e., the scheduling DCI).

Here, a single maximum TB size may be defined for a reference case, and may not be exceeded. For example, the single maximum TB size may be defined for a slot with 14 OFDM symbols. Also, additionally, the TB size may be determined based on one or more parameters(s) (i.e., information). For example, the TB size may be determined based on the number of layers the codeword is mapped onto. Also, the TB size may be determined based on the time resources and/or the frequency resources the PDSCH/the PUSCH is scheduled. For example, the TB size may be determined based on the total number of resource element(s) (RE(s)) available for the PDSCH/the PUSCH. Also, the TB size may be determined based on a reference number of REs per slot and/or mini-slot per PRB and/or the number of PRB(s) for carrying the PDSCH/the PUSCH. Also, the TB size may be determined based on the modulation order. Also, the TB size may be determined based on the coding rate. Here, these parameters (e.g., the number of layers the codeword is mapped onto, the total number of REs available for the PDSCH/the PUSCH, the reference number of REs per slot and/or mini-slot per PRB, and/or the number of PRB(s) for carrying the PDSCH/the PUSCH) may be configured and/or indicated by the gNB 160. Also, these parameters may be determined, by the UE 120, based on the information transmitted by the gNB 160 (i.e., a configuration(s)).

The information used for determining the TB size may be configured and/or indicated by the gNB 160. For example, the gNB 160 may transmit (e.g., by using the RRC message and/or the PDCCH (e.g., the DCI format A, and/or the DCI format B (i.e., the scheduling DCI))) the information on the resource block assignment. Also, the gNB 160 may transmit (e.g., by using the RRC message and/or the PDCCH (e.g., the DCI format A, and/or the DCI format B (i.e., the scheduling DCI))) the information on the modulation and coding scheme.

Also, the gNB 160 may transmit (e.g., by using the RRC message and/or the PDCCH (e.g., the DCI format A, and/or the DCI format B (i.e., the scheduling DCI))) the information used for configuring (e.g., determining) the number of layers the codeword is mapped onto. Also, the gNB 160 may transmit (e.g., by using the RRC message and/or the PDCCH (e.g., the DCI format A, and/or the DCI format B (i.e., the scheduling DCI))) the information used for configuring (e.g., determining) the total number of REs available for the PDSCH/the PUSCH transmission. Also, the gNB 160 may transmit (e.g., by using the RRC message and/or the PDCCH (e.g., the DCI format A, and/or the DCI format B (i.e., the scheduling DCI))) the information used for configuring (e.g., determining) the reference number of REs per slot and/or mini-slot per PRB. Also, the gNB 160 may transmit (e.g., by using the RRC message and/or the PDCCH (e.g., the DCI format A, and/or the DCI format B (i.e., the scheduling DCI))) the information used for configuring (e.g., determining) the number of PRBs for the PDSCH/the PUSCH transmission. Namely, the UE 102 may determine the TB size based on the information that is configured and/or indicated by the gNB 160.

Figure 7:
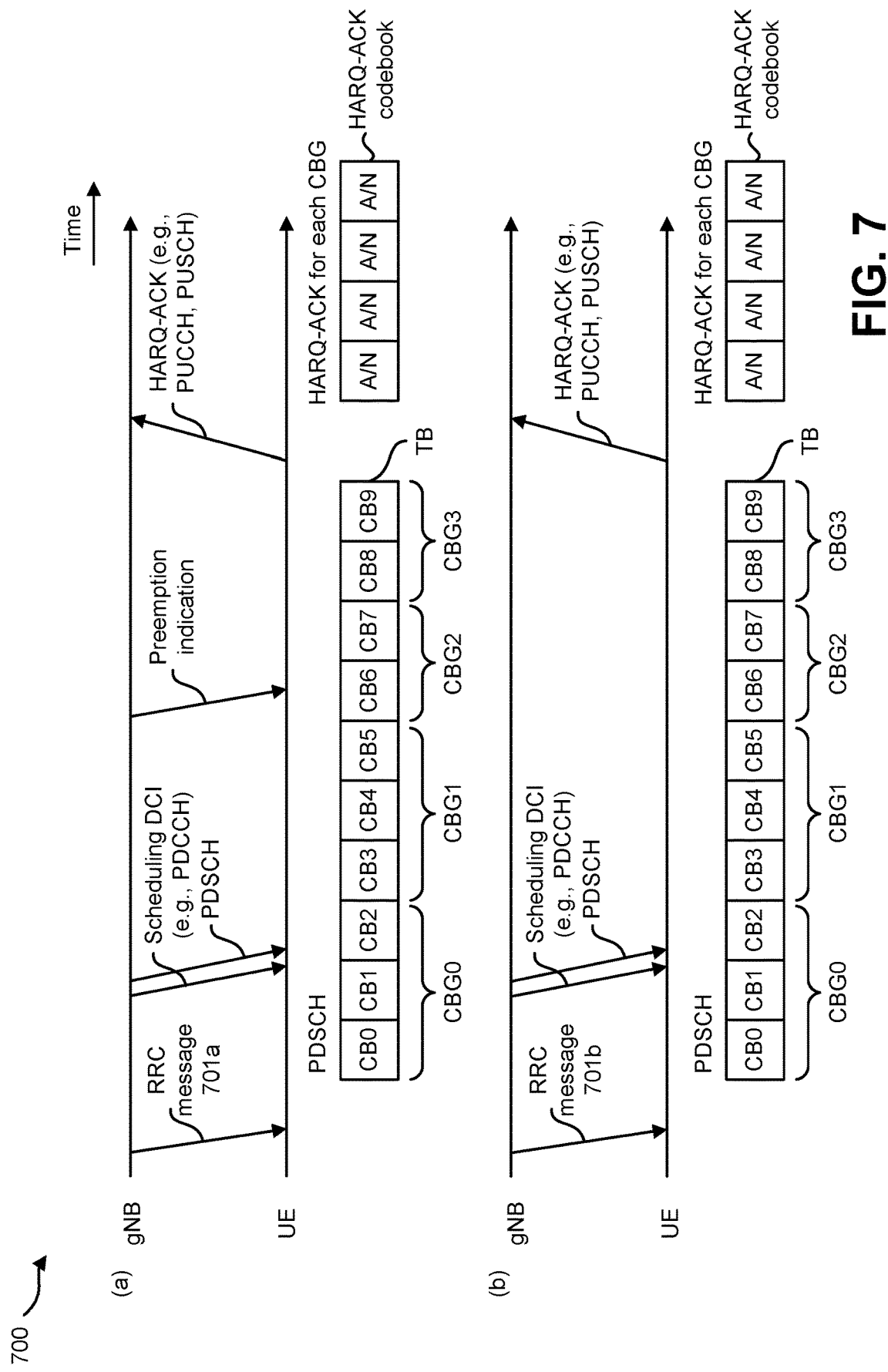
FIG. 7 illustrates an example of code block group(s) (CGB(s))-based downlink data (re)transmission(s)

FIG. 7 illustrates an example 700 of CGB(s)-based downlink data (re)transmission(s). Here, in FIG. 7, the downlink data (re)transmission(s) (e.g., the PDSCH (re)transmission(s)) is described for the sake of simplicity. However, the described systems and methods do not preclude the uplink data (re)transmission(s) (e.g., the PUSCH (re)transmission(s)). Namely, the described systems and methods may be applied to the uplink data (re)transmission(s) similar to the downlink data (re)transmission(s).

Here, in general, data transmission (i.e., the transmission of the downlink and/or the uplink TB(s)) may be preempted (e.g., punctured and/or rate matched) by another transmission. On the other hand, a transport block (TB) may be divided into (e.g., grouped into) one or more code block groups (CBGs). And, in a case that one or more CBGs are not decoded successfully, there may be no need to retransmit the whole TB. Instead, only one or more CBGs that are not decoded successfully may be retransmitted.

An example of CGB(s)-based downlink data (re)transmission is shown in FIG. 7(a). The gNB 160 may transmit the RRC message 701a. Here, the RRC message 701a may include first information used for configuring the CGB(s)-based downlink data (re)transmission is performed (i.e., allowed). Namely, the gNB 160 may transmit the RRC message 701a including first information used for configuring whether the PDSCH transmission(s) includes the CBG (e.g., the CBG of the TB and/or the CBG transmission(s)) or not. Based on the reception (e.g., the configuration) of the first information, the UE 102 may receive the PDSCH transmission that includes the CGB transmissions of the TB.

Also, the RRC message 701 may include second information used for configuring the maximum number (N) of CBG(s) per TB (i.e., the number (N) of CBGs per TB, the number (N) of CBGs for TB). Here, the maximum number (N) of CBGs per TB described herein may be assumed to be included in a maximum number (N) of CBG(s) or the number (N) of CBG(s) in some implementations for the sake of simple description. Namely, for the single codeword case, the maximum number (N) of CBG(s) may be configured per TB (i.e., for the TB, for a single TB). For example, for the single codeword case, the maximum number (N) of CBG(s) may be configured (e.g., indicated) by the RRC message. Here, the maximum number (N) of CBG(s) may be indicated by using the DCI format A, the DCI format B, and/or the DCI format C.

Also, for the multiple codewords case, the gNB 160 may configure the maximum number (N) of CBGs. For example, for the multiple codewords case, the same maximum number of CBG(s) may be configured for each TB. Also, for the multiple codewords case, the same or different maximum number of CBG(s) may be configured for each TB. Namely, the gNB 160 may configure two parameters on the maximum number of CB(s) per TB to the UE 102. Also, for the multiple codewords case, the gNB 160 may configure the maximum number of CBG(s) to be shared by both codewords. Namely, the maximum number of CBG(s) (i.e., the total number of CBGs) may be divided for each codeword.

Also, the RRC message 701 may include third information used for configuring the number (C) of CB(s) within the TB. Here, the number (C) of CB(s) within the TB described herein may be assumed to be included in a number (C) of CB(s) in some implementations for the sake of simple description. Namely, for the single codeword case, the number (C) of CB(s) may be configured per TB (i.e., for the TB, for a single TB). Also, for example, for the multiple codewords case, the number (C) of CB(s) may be configured for each TB.

Also, the RRC message may include fourth information used for configuring a PDSCH transmission mode (e.g., a type of the PDSCH transmission, a scheme of the PDSCH transmission). For example, the gNB 160 may configure the PDSCH transmission mode that supports one TB (one TB transmission). Also, the gNB 160 may configure the PDSCH transmission mode that supports up to two TBs (up to two TBs transmission). And, in a case that the PDSCH transmission that supports one TB is configured, the UE 102 may apply the process of the single codeword case for the PDSCH reception (i.e., the CGB(s)-based PDSCH reception). Also, in a case that the PDSCH transmission mode that supports up to two TBs is configured, the UE 102 may apply the process of the multiple codeword case for the PDSCH reception (i.e., the CGB(s)-based PDSCH reception). Here, the UE 102 may monitor, simultaneously, the some types of DCI format (e.g., the some types of DCI format and/or the some types of RNTI (i.e., the some types of DCI format with the some types of RNTI)). Namely, for example, in a single PDSCH transmission mode, the some types of PDSCH transmission (e.g., the first types of PDSCH transmission and/or the second types of PDSCH transmission) may be used. Also, for example, in a single PUSCH transmission more, the some types of PUSCH transmission (e.g., the first types of PUSCH transmission and/or the second types of PUSCH transmission) may be used. For example, as described above, the UE 102 may receive, based on the detected DCI format A (e.g., the DCI format 1 and/or the DCI format 1A, or the DCI format X and/or the DCI format Y), one type(s) of PDSCH transmission (e.g., the first types of PDSCH transmission or the second types of PDSCH transmission). Also, the UE 102 may receive, based on the RNTI used for the detected DCI format A (e.g., the first C-RNTI or the second C-RNTI), one type(s) of PDSCH transmission (e.g., the first types of PDSCH transmission or the second types of PDSCH transmission). Also, the UE 102 may perform, based on the detected DCI format B (e.g., the DCI format 0 and/or the DCI format 6, or the DCI format M and/or the DCI format N), one type(s) of PUSCH transmission (e.g., the first types of PUSCH transmission or the second types of PUSCH transmission). Also, the UE 102 may perform, based on the RNTI used for the detected DCI format B (e.g., the first C-RNTI or the second C-RNTI), one type(s) of PUSCH transmission (e.g., the first types of PUSCH transmission or the second types of PUSCH transmission).

Here, the gNB 160 may transmit by using the RRC message 701, for each of the primary cell and/or the one or more secondary cells, the first information, the second information, the third information, and/or the fourth information. Namely, for example, the gNB 160 may configure, per serving cell (i.e., for each of the primary cell and/or the one or more secondary cells), the CGB(s)-based downlink data (re)transmission is performed (i.e., allowed). Also, the gNB 160 may configure, per serving cell (i.e., for each of the primary cell and/or the one or more secondary cells), the maximum number (N) of CBG(s). Also, the gNB 160 may configure, per serving cell (i.e., for each of the primary cell and/or the one or more secondary cells), the number (C) of CB(s) within the TB. Also, the gNB 160 may configure, per serving cell (i.e., for each of the primary cell and/or the one or more secondary cells), the PDSCH transmission mode.

Also, in FIG. 7, the gNB 160 may transmit on the PDCCH, the DCI format A (i.e., the scheduling DCI (e.g., the DCI format 1, the DCI format 1A, the DCI format X, the DCI format Y, the DCI format 2, the DCI format 2B, the DCI format K, and/or the DCI format L)). As described above, the DCI format A may include the information (e.g., the information on resource block assignment, and/or the information on the modulation and coding scheme) used for determining the TB size (the size of TB carried in the PDSCH). Based on the detection of the DCI format A, the UE 102 may receive (decode) the PDSCH (the PDSCH transmission). Here, the PDSCH transmission may be preempted (e.g., punctured, and/or rate matched) by another transmission.

Also, the gNB 160 may transmit on the PDCCH, the DCI format C. As described above, the DCI format C may include the preemption indication used for indicating which resource has been preempted. Also, the DCI format C may include the CBGTI used for indicating which CBG(s) is/are (re)transmitted. Also, the DCI format C may include the CBGFI used for indicating which CBG(s) is/are handled differently for soft-buffer and/or HARQ combining. Here, the number of bits of the preemption indication (i.e., the preemption indication field) included in the DCI format (e.g., the DCI format C) may be determined based on the maximum number (N) of CBGs that is configured by using the RRC message. Also, the number of bits of the CBGTI (i.e., the CBTI field) included in the DCI format (e.g., the DCI format A, the DCI format B, and/or the DCI format C) may be determined based on the maximum number (N) of CBGs that is configured by using the RRC message. Also, the number of bits of the CBGFI (i.e., the CBGFI field) included in the DCI format (e.g., the DCI format A, the DCI format B, and/or the DCI format C) may be determined based on the maximum number (N) of CBGs that is configured by using the RRC message. Here, the number of bits of CBGFI (i.e., the CBGFI field) included in the DCI format (e.g., the DCI format A, the DCI format B, and/or the DCI format C) may be 1 bit. Namely, the maximum number (N) of CBGs may be configured as the number of bits of the preemption indication, the number of bits of the CBGTI, and/or the number of bits of the CBGFI.

The UE 102 may decode (receive) the PDSCH (i.e., the PDSCH transmission) based on the preemption indication, the CBGTI, and/or the CBGFI. Namely, the UE 102 may recognize, based on the preemption indication, which resource has been preempted. Also, the UE 102 may recognize, based on the CBGTI, which CBG(s) is/are (re)transmitted. Also, the UE 102 may recognize, based on the CBGFI, which CBG(s) is/are handled differently for soft-buffer and/or HARQ combining.

Also, based on the decoding of the PDSCH transmission, the UE 102 may transmit the HARQ-ACK for the PDSCH transmission (i.e., the HARQ-ACK for the CGB(s)-based PDSCH transmission). For example, the UE 102 may transmit the HARQ-ACK for the PDSCH transmission that is scheduled by using the DCI format 1 and/or the DCI format 1A. Also, the UE 102 may transmit the HARQ-ACK for the PDSCH transmission that is scheduled by using the DCI format X and/or the DCI format Y. For example, the UE 102 may transmit the HARQ-ACK corresponding to all the CBG(s) (i.e., all the CBG(s) of the TB, all the CBG(s) of the PDSCH transmission, all the CBG(s) including the non-scheduled CBG(s)). Namely, the number of the HARQ-ACK bits (i.e., HARQ-ACK payload size) may be determined based on the maximum number (N) of CBGs that is configured by using the RRC message. Here, the determination of the number of the HARQ-ACK bits may be defined as the determination of the HARQ-ACK codebook size. Namely, the determination of the number of the HARQ-ACK bits may correspond to the determination of the HARQ-ACK codebook size. Namely, the size of the HARQ-ACK codebook may be determined based on the maximum number (N) of CBGs that is configured by using the RRC message. For example, for the single codeword case, the HARQ-ACK codebook may include the HARQ-ACK bit(s) corresponding to all the CBG(s). And, the HARQ-ACK payload size may be the same with the maximum number (N) of CBG(s). Here, each HARQ-ACK bits may correspond to each CBG. Here, ACK is transmitted for a CBG if the CBG has been successfully decoded. Also, NACK is transmitted for a CBG if the CBG has not been successfully decoded. Also, NACK is transmitted for a CBG that is preempted (i.e., punctured, and/or rate matched).

The UE 102 may transmit on the PUCCH, the HARQ-ACK for the PDSCH transmission. Also, the UE 102 may transmit on the PUSCH, the HARQ-ACK for the PDSCH transmission. Here, in a case that the first information is configured, and, if the UE 102 is transmitting on the PUSCH (i.e., the PUSCH is scheduled), the UE 102 may always transmit on the PUSCH, the HARQ-ACK for the PDSCH transmission (i.e., the CBG(s)-based PDSCH transmission). In a case that the first information is configured, and, if the UE 102 is transmitting on the PUSCH, the UE 102 may always assume, for the HARQ-ACK transmission, that the PDSCH transmission is the CBG(s)-based PDSCH transmission. For example, for the HARQ-ACK transmission on the PUSCH, the UE 102 may always determine the HARQ-ACK codebook size based on the maximum number (N) of CBG(s). For the HARQ-ACK transmission on the PUSCH, the UE 102 may not transmit the HARQ-ACK corresponding to the TB (i.e., the HARQ-ACK corresponding to the whole TB). Only for the HARQ-ACK transmission on the PUCCH, the UE 102 may transmit the HARQ-ACK corresponding to the TB (i.e., the HARQ-ACK corresponding to the whole TB).

In a case that the first information is configured (i.e., in a case that the UE is configured by the first information to receive the PDSCH transmission(s) that include the CBG transmission(s)), the UE 102 may be configured, by using the RRC message, the maximum number (N) of CBG(s) for generating respective HARQ-ACK information bits for the reception of the TB. Also, in a case that the first information is not configured, the UE 102 may generate the HARQ-ACK information bit for each TB.

Another example of CGB(s)-based downlink data (re) transmission is shown in FIG. 7(b). As shown in FIG. 7(b), the gNB 160 may transmit the RRC message 701b. As described above, the RRC message 701b may include the first information, the second information, the third information, and/or the fourth information. Also, the gNB 160 may transmit by using the RRC message, per serving cell (i.e., for each of the primary cell and/or the one or more secondary cells), the first information, the second information, the third information, and/or the fourth information. Also, the maximum number (N) of CBG(s) TB may be indicated by using the DCI format A, the DCI format B, and/or the DCI format C.

Also, the gNB 160 may transmit on the PDCCH, the DCI format A (i.e., the scheduling DCI (e.g., the DCI format 1, the DCI format 1A, the DCI format X, the DCI format Y, the DCI format 2, the DCI format 2B, the DCI format K, and/or the DCI format L)), and/or the DCI format B (i.e., the scheduling DCI (e.g., the DCI format 0, the DCI format 6, the DCI format M, the DCI format N, the DCI format 4, the DCI format 4B, the DCI format P, and/or the DCI format Q)). Here, as described above, the DCI format A, and/or the DCI format B may include the CBGTI and/or the CBGFI. And, the number of bits of the CBGTI (i.e., the CBTI field)

included in the DCI format A and/or the DCI format B may be determined based on the maximum number (N) of CBGs that is configured by using the RRC message. Also, the number of bits of the CBGFI (i.e., the CBGFI field) included in the DCI format A and/or the DCI format B may be determined based on the maximum number (N) of CBGs that is configured by using the RRC message. Also, the number of bits of CBGFI (i.e., the CBGFI field) included in the DCI format A and/or the DCI format B may be 1 bit. The maximum number (N) of CBGs may be configured as the number of bits of the CBGTI, and/or the number of bits of the CBGFI. Also, similar to the explanation of FIG. 7(a), the UE 102 may decode (receive) the PDSCH (i.e., the PDSCH transmission) based on the CBGTI, and/or the CBGFI. Also, similar to the explanation of FIG. 7(a), based on the decoding of the PDSCH transmission, the UE 102 may transmit, on the PUCCH and/or the PUSCH, the HARQ-ACK for the PDSCH transmission (i.e., the CGB(s)-based PDSCH transmission).

Here, in FIG. 7, for the PDSCH transmission, a CBG(s) construction may be described. For example, in FIG. 7, the maximum number (N) of CBGs per TB is considered as "4 (i.e., CBG0, CBG1, CBG2, and CBG3)". Namely, the gNB 160 may configure "4" as the maximum number (N) of CBG(s) per TB. Also, in FIG. 7, the number (C) of CB(s) within the TB is considered as "10 (i.e., CB0, CB1, CB2, CB3, CB4, CB5, CB6, CB7, CB8, and CB9)". Namely, the gNB 160 may configure "10" as the number (C) of CB(s) within the TB. And, the TB including 10 CBs may be segmented (i.e., divided into) (M) CBGs. Here, for example, the number (M) of CBG(s) in the TB may be equal to min (C, N), where C is the number of CB(s) within the TB and N is the maximum number (N) of CBG(s). Namely, the number (M) of CBG(s) in the TB may be defined as the formula. Here, a function of min (X, Y) is a function which gives a minimum value among X (e.g., a value "X") and Y (e.g., a value "Y"). And, the number (M) of CBG(s) in the TB may be determined based on the number (C) of CB(s) within the TB and the maximum number (N) of CBG(s) per TB. Here, the details of the maximum number (N) of CBG(s) per TB is described below.

In an example, for the CBG(s) construction, the first Mod (C, M) CBG(s) out of total (M) CBG(s) may include ceil (C/M) CB(s) per CBG. Also, for example, the remaining M-Mod (C, M) CBG(s) may include floor (C/M) CB(s) per CBG. Here, Mod (C, M) is modulo function of C and M. And, ceil (C/M) is ceil function of C and M. Also, floor (C/M) is floor function of C and M.

Figure 8:
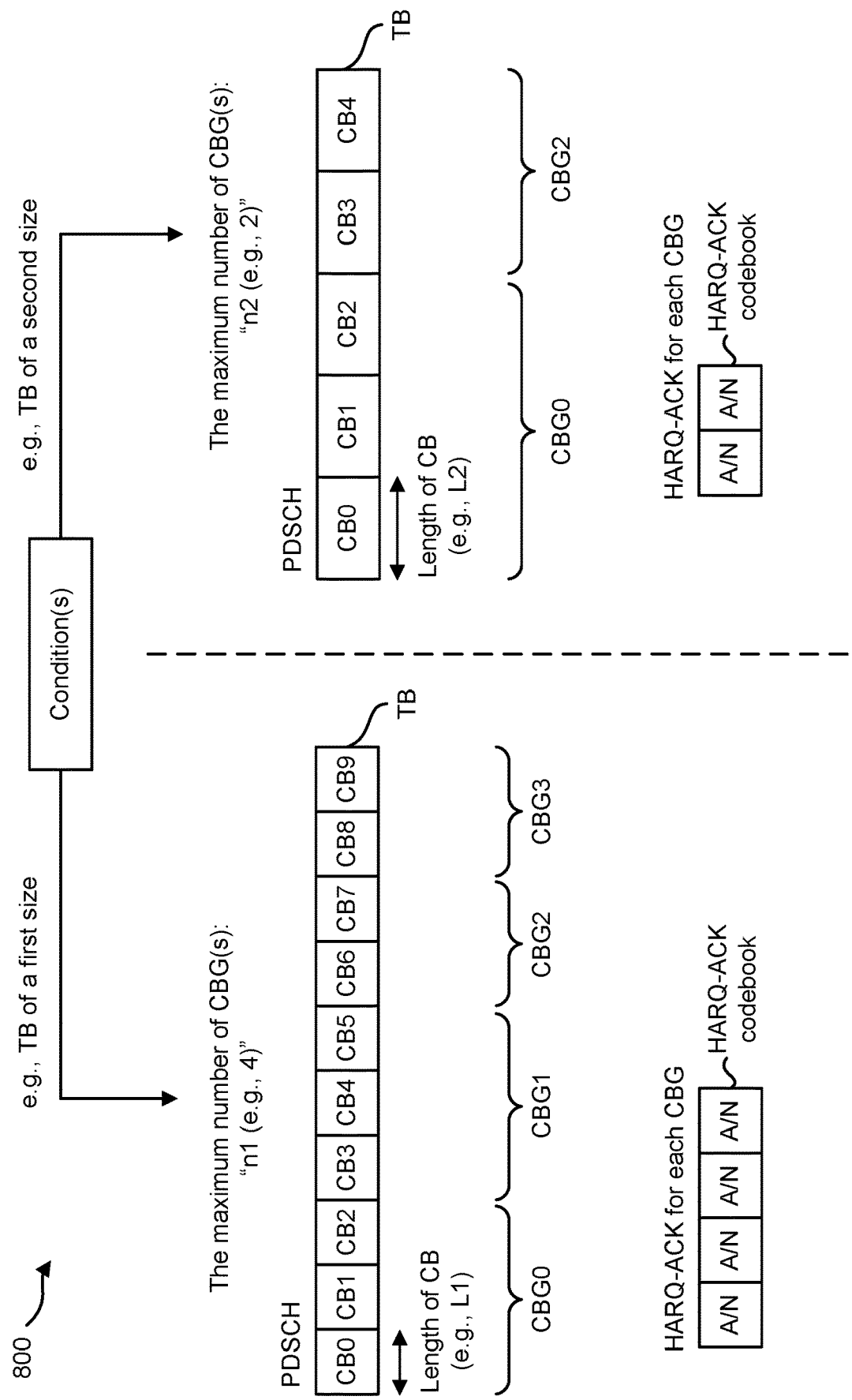
FIG. 8 is an example of a process of CBG(s) construction.

FIG. 8 illustrates an example of a process 800 of CBG(s) construction (i.e., the CBG(s) segmentation). Here, for a single code word case, more than one value of the maximum number of CBG(s) per TB (i.e., more than one maximum number of CBG(s) per TB) may be configured. Here, the more than one value of the number of CBG(s) per TB described herein may be assumed to be included in more than one value of the maximum number of CBG(s). Namely, for the single codeword case, the gNB 160 may configure, by using the RRC message, more than one value of the maximum number of CBG(s). For example, for the single codeword case, the gNB 160 may configure, by using the RRC message, two values (e.g., n1 and n2) of the maximum number of CBG(s). Here, for the multiple codewords case (e.g., for two codewords case), twice of more than one value of the maximum number of CBG(s) may be configured. Namely, in a case that "2" is configured, for the single codeword case, as the maximum number of CBG(s), "4" may be configured, for the two codewords case, as the maximum number of CBG(s).

In FIG. 8, for the single codeword case, the gNB 160 may configure, by using the RRC message, the two values (e.g., n1 and n2) of the maximum number of CBG(s). And, the UE 102 may select, based on a condition(s), one (e.g., n1 or n2) of the two values of the maximum number of CBG(s). And, of the UE 102 may perform the CBG(s) construction (i.e., the CBG(s) segmentation) as described above. For example, the UE 102 may determine the number (M) of CBG(s) in the TB, and the number (M) of CBG(s) in the TB may be determined based on the number (C) of CB(s) within the TB and the selected one value (e.g., n1 or n2). Namely, the UE 102 may use, based on the condition(s), the one (e.g., n1 or n2) of the two values to determine the number (M) of CBG(s) in the TB. Namely, the UE 102 may determine, based on the selected value (e.g., n1 or n2), the number (M) of CBG(s) in the TB.

Also, as described above, the size of the HARQ-ACK codebook (i.e., the number of HARQ-bits, the HARQ-ACK payload) may be determined based on the maximum number (N) of CBG(s). Namely, for the single codeword case, the UE 102 may select, based on the condition(s), the one (e.g., n1 or n2) of the two values of the maximum number of CBG(s). And, the UE 102 may determine, based on the selected one value (e.g., n1 or n2), the size of the HARQ-ACK codebook. Namely, the UE 102 may use, based on the condition(s), the one (e.g., n1 or n2) of the two values to determine the size of the HARQ-ACK codebook.

Also, as described above, the number of bits of the preemption indication (the preemption indication field) may be determined based on the maximum number (N) of CBG(s). Namely, for the single codeword case, the UE 102 may select, based on the condition(s), the one (e.g., n1 or n2) of the two values of the maximum number of CBG(s). And, the UE 102 may determine, based on the selected one value (e.g., n1 or n2), the number of bits of the preemption indication. Namely, the UE 102 may use, based on the condition(s), the one (e.g., n1 or n2) of the two values to determine the number of bits of the preemption indication.

Also, as described above, the number of bits of the CBGTI (the CBGTI field) may be determined based on the maximum number (N) of CBG(s). Namely, for the single codeword case, the UE 102 may select, based on the condition(s), the one (e.g., n1 or n2) of the two values of the maximum number of CBG(s). And, the UE 102 may determine, based on the selected one value (e.g., n1 or n2), the number of bits of the CBGTI. Namely, the UE 102 may use, based on the condition(s), the one (e.g., n1 or n2) of the two values to determine the number of bits of the CBGTI.

Also, as described above, the number of bits of the CBGFI (the CBGFI field) may be determined based on the maximum number (N) of CBG(s). Namely, for the single codeword case, the UE 102 may select, based on the condition(s), the one (e.g., n1 or n2) of the two values of the maximum number of CBG(s). And, the UE 102 may determine, based on the selected one value (e.g., n1 or n2), the number of bits of the CBGFI. Namely, the UE 102 may use, based on the condition(s), the one (e.g., n1 or n2) of the two values to determine the number of bits of the CBGFI.

Namely, for example, in a case that the UE 102 selects the one value (e.g., n1, a first value) of the two values of the maximum number of CGB(s), the UE 102 may use the one value (i.e., n1, the first value) to determine the number (M) of CBG(s) in the TB, the size of the HARQ-ACK codebook, the number of bits of the preemption indication, the number of bits of the CBGTI, and/or the number of bits of the CBGFI. Also, for example, in a case that the UE 102 selects another one value (e.g., n2, a second value) of the two values of the maximum number of CGB(s), the UE 102 may use the another one value (i.e., n2, the second value) to determine the number (M) of CBG(s) in the TB, the size of the HARQ-ACK codebook, the number of bits of the preemption indication, the number of bits of the CBGTI, and/or the number of bits of the CBGFI.

Here, as shown in FIG. 8, a length of each CB (e.g., L1 or L2) in the TB may vary (e.g., based on the modulation and coding scheme). Namely, the length of each CB in the TB may be determined based on the CBG(s) construction. For example, the length of each CB in the TB may be determined based on the number (M) of CBG(s) in the TB. Namely, the length of each CB in the TB may be determined (e.g., changed, varied) based on the one value (e.g., n1 or n2) selected from the two values of the maximum number (N) of CBG(s).

Here, the condition(s) may include the size of the TB. Namely, the UE 102 may select, based on the size of the TB (e.g., a payload size), the one value (e.g., n1 or n2, the first value or the second value) of the two values of the maximum number of CGB(s). For example, in a case that the size of the TB is equal to or greater than a first certain value(s) (e.g., the first certain size), the UE 102 may select the first value (i.e., n1) of the two values of the maximum number of CBG(s). For example, in a case that the size of the TB is determined based on the information included in a first DCI format (e.g., the DCI format 1 and/or the DCI format 1A) and the size of the TB is equal or greater than the first certain value(s), the UE 102 may select the first value (i.e., n1) of the two values of the maximum number of CBG(s). Also, in a case that the size of the TB is smaller than the first certain value(s) (e.g., the first certain size), the UE 102 may select the second value (i.e., n2) of the two values of the maximum number of CBG(s). For example, in a case that the size of the TB is determined based on the information included in a second DCI format (e.g., the DCI format X and/or the DCI format Y) and the size of the TB is smaller than the first certain value(s), the UE 102 may select the second value (i.e., n2) of the two values of the maximum number of CBG(s). Here, the TB size determination may be performed described above.

Here, in a case that the size of the TB is determined based on the information included in the first DCI format and the size of the TB is smaller than the first certain value(s), the UE 102 may assume a third certain value(s) (e.g., "1" or "0") as the maximum number (N) of CBG(s). Also, in a case that the size of the TB is determined based on the information included in the first DCI format and the size of the TB is smaller than the first certain value(s), the UE 102 may assume a fourth certain value(s) (e.g., "1" or "0") as the maximum number (C) of CB (s) within the TB. Namely, the fourth certain value(s) may be a same value(s) as the third certain value(s). Namely, in a case that the size of the TB is determined based on the information included in the first DCI format and the size of the TB is smaller than the first certain value(s), the UE 102 may assume a third certain value(s) as the maximum number (N) of CBG(s) and/or the fourth certain value(s) as the maximum number (C) of CB (s) within the TB. Namely, in this case, the UE 102 may assume the CBG(s)-based transmission is not applied for the PDSCH transmission(s) (i.e., the PDSCH transmission(s) does not include the CBG(s) (e.g., the CBG(s) transmission(s)). Namely, in this case, the UE 102 may assume the TB-based transmission is always applied for the PDSCH transmission(s) (i.e., the PDSCH transmission(s) includes the TB (e.g., the TB transmission(s)). Namely, a minimum size of the TB (e.g., the first certain value(s), a minimum value of the TB) may be defined for the CBG(s)-based PDSCH transmission (e.g., the CBG(s)-based PDSCH transmission scheduled by using the first DCI format).

Also, for example, in a case that the size of the TB is determined based on the information included in the second DCI format (e.g., the DCI format X and/or the DCI format Y) and the size of the TB is equal to or greater that the first certain value(s), the UE 102 may select the second value (i.e., n2) of the two values of the maximum number of CBG(s). Here, in a case that the size of the TB is determined based on the information included in the second DCI format and the size of the TB is smaller than the first certain value(s), the UE 102 may assume the third certain value(s) as the maximum number (N) of CBG(s). Also, in a case that the size of the TB is determined based on the information included in the first DCI format and the size of the TB is smaller than the first certain value(s), the UE 102 may assume the fourth certain value(s) as the maximum number (C) of CB (s) within the TB. Namely, in a case that the size of the TB is determined based on the information included in the second DCI format and the size of the TB is smaller than the first certain value(s), the UE 102 may assume the third certain value(s) as the maximum number (N) of CBG(s) and/or the fourth certain value(s) as the maximum number (C) of CB (s) within the TB. Namely, in this case, the UE 102 may assume the CBG(s)-based transmission is not applied for the PDSCH transmission(s) (i.e., the PDSCH transmission(s) does not include the CBG(s) (e.g., the CBG(s) transmission(s)). Namely, in this case, the UE 102 may assume the TB-based transmission is always applied for the PDSCH transmission(s) (i.e., the PDSCH transmission(s) includes the TB (e.g., the TB transmission(s)). Namely, a minimum size of the TB (e.g., the first certain value(s), a minimum value of the TB) may be defined for the CBG(s)-based PDSCH transmission (e.g., the CBG(s)-based PDSCH transmission scheduled by using the second DCI format). Here, the minimum value of the TB (e.g., the first certain value(s)) may be independently defined (e.g., configured) for the first DCI format and the second DCI format.

Namely, as shown in FIG. 8, in a case that the size of the TB size is a first certain size (e.g., a first certain value(s)), the UE 102 may select the first value (i.e., n1) of the two values of the maximum number of CBG(s). Also, in a case that the size of the TB size is a second certain size (e.g., a second certain value(s)), the UE 102 may select the second value (i.e., n2) of the two values of the maximum number of CBG(s).

Also, the condition(s) may include the number (C) of CB(s) within the TB. Namely, the UE 102 may select, based on the number (C) of CB(s) within the TB, the one value (e.g., n1 or n2, the first value or the second value) of the two values of the maximum number of CGB(s). For example, in a case that the number (C) of CB(s) within the TB is smaller than a fifth certain value(s), the UE 102 may select the first value (i.e., n1) of the two values of the maximum number of CBG(s). Also, in a case that the number (C) of CB(s) within the TB is equal to or greater than the fifth certain value(s), the UE 102 may select the second value (i.e., n2) of the two values of the maximum number of CBG(s).

Also, the condition(s) may include the RNTI used for the scheduling DCI (e.g., the DCI format A (e.g., the DCI format 1, the DCI format 1A, the DCI format X, the DCI format Y, the DCI format 2, the DCI format 2B, the DCI format K, and/or a DCI format L), and/or the DCI format B (e.g., the DCI format 0, the DCI format 6, the DCI format M, the DCI format N, the DCI format 4, the DCI format 4B, the DCI format P, and/or the DCI format Q)). Namely, the condition(s) may include the RNTI used for scrambling of the CRC parity bits that is attached to the scheduling DCI (i.e., the RNTI used for transmission of the scheduling DCI). Namely, the UE 102 may select, based on the RNTI used for transmission of the scheduling DCI, the one value (e.g., n1 or n2, the first value or the second value) of the two values of the maximum number of CGB(s). For example, in a case that the first RNTI (e.g., the first C-RNTI) is used for transmission of the scheduling DCI (i.e., the RNTI used for transmission of the scheduling DCI is a certain RNTI), the UE 102 may select the first value (i.e., n1) of the two values of the maximum number of CBG(s). Also, in a case that the second RNTI (e.g., the second C-RNTI) is used for the scheduling DCI (i.e., the RNTI used for the scheduling DCI is not the certain RNTI), the UE 102 may select the second value (i.e., n2) of the two values of the maximum number of CBG(s). Here, the certain RNTI may be defined, in advance, by the specification, and may be known information between the gNB 160 and the UE 102. Namely, the certain RNTI may be a predetermined RNTI (e.g., a predetermined C-RNTI). Here, the gNB 160 may transmit, by using the RRC message, information used for configuring the certain RNTI. Namely, the UE 102 may determine the certain RNTI based on the information that is configured by the gNB 160.

Here, in a case that the SI-RNTI, the P-RNTI, the RA-RNTI, and/or the Temporary C-RNTI is used for transmission of the scheduling DCI, the UE 102 may assume the third certain value(s) as the maximum number (N) of CBG(s). Namely, for example, in a case that the CRC parity bits that is attached to the scheduling DCI is scrambled by the SI-RNTI, the P-RNTI, the RA-RNTI, and/or the Temporary C-RNTI, the UE 102 may assume the third certain value(s) as a value of the maximum number of CBG(s). Also, in a case that the SI-RNTI, the P-RNTI, the RA-RNTI, and/or the Temporary C-RNTI is used for the scheduling DCI, the UE 102 may assume the fourth certain value(s) as the number (C) of CB(s) within the TB. Namely, for example, in a case that the CRC parity bits that is attached to the scheduling DCI is scrambled by the SI-RNTI, the P-RNTI, the RA-RNTI, and/or the Temporary C-RNTI, the UE 102 may assume the fourth certain value(s) as a value of the number (C) of CB(s) within the TB. Namely, in a case that the SI-RNTI, the P-RNTI, the RA-RNTI, and/or the Temporary C-RNTI is used for transmission of the scheduling DCI, the UE 102 may assume the third certain value(s) as the maximum number of CBG(s), and/or the fourth certain value(s) as the number (C) of CB(s) within the TB.

Namely, in a case that the SI-RNTI, the P-RNTI, the RA-RNTI, and/or the Temporary C-RNTI is used for transmission of the scheduling DCI, the number (M) of CBG(s) in the TB may be assumed as (e.g., considered as, specified as, and/or determined based on) the third certain value(s) and/or the fourth certain value(s). Also, in a case that the SI-RNTI, the P-RNTI, the RA-RNTI, and/or the Temporary C-RNTI is used for transmission of the scheduling DCI, the size of the HARQ-ACK codebook size may be assumed as (e.g., considered as, specified as, and/or determined based on) the third certain value(s) and/or the fourth certain value(s). Also, in a case that the SI-RNTI, the P-RNTI, the RA-RNTI, and/or the Temporary C-RNTI is used for transmission of the scheduling DCI, the number of bits of the preempted indication included in the DCI format (e.g., the DCI format C) may be assumed as (e.g., considered as, specified as, and/or determined based on) the third certain value(s) and/or the fourth certain value(s). Also, in a case that the SI-RNTI, the P-RNTI, the RA-RNTI, and/or the Temporary C-RNTI is used for transmission of the scheduling DCI, the number of bits of the CBGTI included in the DCI format (e.g., the DCI format A, the DCI format B, and/or the DCI format C) may be assumed as (e.g., considered as, specified as, and/or determined based on) the third certain value(s) and/or the fourth certain value(s). Also, in a case that the SI-RNTI, the P-RNTI, the RA-RNTI, and/or the Temporary C-RNTI is used for transmission of the scheduling DCI, the number of bits of the CBGFI included in the DCI format (e.g., the DCI format A, the DCI format B, and/or the DCI format C) may be assumed as (e.g., considered as, specified as, and/or determined based on) the third certain value(s) and/or the fourth certain value(s). Namely, in a case that the SI-RNTI, the P-RNTI, the RA-RNTI, and/or the Temporary C-RNTI is used for transmission of the scheduling DCI, the UE 102 may assume the CBG(s)-based transmission is not applied for the PDSCH transmission(s) (i.e., the PDSCH transmission(s) does not include the CBG(s) (e.g., the CBG(s) transmission(s)). Namely, in a case that the SI-RNTI, the P-RNTI, the RA-RNTI, and/or the Temporary C-RNTI is used for transmission of the scheduling DCI, the UE 102 may assume the TB-based transmission is always applied for the PDSCH transmission(s) (i.e., the PDSCH transmission(s) includes the TB (e.g., the TB transmission(s)). Namely, RNTI may be defined for the CBG(s)-based PDSCH transmission. For example, only the C-RNTI (e.g., the first C-RNTI and/or the second C-RNTI) may be used for the CBG(s)-based PDSCH transmission.

In an example, in a case that the CRC parity bits that are attached to the DCI format A are scrambled by the SI-RNTI, the P-RNTI, and/or the RA-RNTI, the UE 102 may assume, for the PDSCH transmission, the third certain value(s) as the maximum number of CBG(s), and/or the fourth certain value(s) as the number of CB(s) within the TB. Also, for example, in a case that the CRC parity bits that are attached to the DCI format B are scrambled by the Temporary C-RNTI, the UE 102 may assume, for the PUSCH transmission, the third certain value(s) as the maximum number of CBG(s), and/or the fourth certain value(s) as the number of CB(s) within the TB.

Also, the condition(s) may include a DCI format (e.g., the scheduling DCI format (e.g., the DCI format A, the DCI format B, and/or the DCI format C)) used for the scheduling of the PSCH (e.g., the PDSCH and/or the PUSCH). Namely, the UE 102 may select, based on the DCI format used for scheduling of PSCH, the one value (e.g., n1 or n2, the first value or the second value) of the two values of the maximum number of CGB(s). For example, in a case that the first DCI format (e.g., the DCI format 1 and/or the DCI format 1A) is used for the scheduling of the PSCH (i.e., the DCI format used for the scheduling of the PSCH is a first certain DCI format), the UE 102 may select the first value (i.e., n1) of the two values of the maximum number of CGB(s). Also, in a case that the second DCI format (e.g., the DCI format X and/or the DCI format Y) is used for the scheduling of the PSCH (i.e., the DCI format used for the scheduling of the PSCH is not the first certain DCI format), the UE 102 may select the second value (i.e., n2) of the two values of the maximum number of CBG(s). Here, the first certain DCI format may be defined, in advance, by the specification, and may be known information between the gNB 160 and the UE 102. Namely, the first certain DCI format may be a predetermined DCI format. Here, the gNB 160 may transmit, by using the RRC message, information used for configuring the first certain DCI format. Namely, the UE 102 may determine the first certain DCI format based on the information that is configured by the gNB 160.

Here, in a case that a second certain DCI format is used for the scheduling of the PSCH, the UE 102 may assume the third certain value(s) as the maximum number of CBG(s). Also, in a case that the second certain DCI format is used for the scheduling of the PSCH, the UE 102 may assume the fourth certain value(s) as the number (C) of CB(s) within the TB. Namely, in a case that the second certain DCI format is used for the scheduling of the PSCH, the UE 102 may assume the third certain value(s) as the value of the maximum number of CBG(a), and/or the fourth certain value(s) as the value of the number (C) of CB(s) within the TB.

Namely, in a case that the second certain DCI format is used for scheduling of the PSCH, the number (M) of CBG(s) in the TB may be assumed as (e.g., considered as, specified as, and/or determined based on) the third certain value(s) and/or the fourth certain value(s). Also, in a case that the second certain DCI format is used for scheduling of the PSCH, the size of the HARQ-ACK codebook size may assumed as (e.g., considered as, specified as, and/or determined based on) the third certain value(s) and/or the fourth certain value(s). Also, in a case that the second certain DCI format is used for scheduling of the PSCH, the number of bits of the preempted indication included in the DCI format (e.g., the DCI format C) may be assumed as (e.g., considered as, specified as, and/or determined based on) the third certain value(s) and/or the fourth certain value(s). Also, in a case that the second certain DCI format is used for scheduling of the PSCH, the number of bits of the CBGTI included in the DCI format (e.g., the DCI format A, the DCI format B, and/or the DCI format C) may be assumed as (e.g., considered as, specified as, and/or determined based on) the third certain value(s) (e.g., "1" or "0") and/or the fourth certain value(s). Also, in a case that the second certain DCI format is used for scheduling of the PSCH, the number of bits of the CBGFI included in the DCI format (e.g., the DCI format A, the DCI format B, and/or the DCI format C) may be assumed as (e.g., considered as, specified as, and/or determined based on) the third certain value(s) and/or the fourth certain value(s). Namely, in a case that the second certain DCI format is used for scheduling of the PSCH, the UE 102 may assume the CBG(s)-based transmission is not applied for the PDSCH transmission(s) (i.e., the PDSCH transmission(s) does not include the CBG(s) (e.g., the CBG(s) transmission(s)). Namely, in a case that the second certain DCI format is used for scheduling of the PSCH, the UE 102 may assume the TB-based transmission is always applied for the PDSCH transmission(s) (i.e., the PDSCH transmission(s) includes the TB (e.g., the TB transmission(s)). Namely, a DCI format(s) may be defined for the CBG(s)-based PDSCH transmission.

Here, the second certain DCI format may be defined, in advance, by the specification, and may be known information between the gNB 160 and the UE 102. Namely, the second certain DCI format may be a second predetermined DCI format. Here, the gNB 160 may transmit, by using the RRC message (e.g., system information, a cell-specific parameter), information used for configuring the second certain DCI format. Namely, the UE 102 may determine the second certain DCI format based on the information that is (e.g., cell-specifically) configured by the gNB 160. Also, the second certain DCI format may be detected (i.e., monitored, decoded) only in the CSS (e.g., the CORESET of the CSS). The UE 102 may detect (i.e., monitor, decode) the second certain DCI format only in the CSS (e.g., the CORESET of the CSS).

For example, in a case that the second certain DCI format for the downlink is used for scheduling of the PDSCH, the UE 102 may assume the third certain value(s) as the maximum number of CBG(s), and/or the fourth certain value(s) as the number of CB(s) within the TB. Also, in a case that the second certain DCI format for the uplink is used for scheduling of the PUSCH, the UE 102 may assume the third certain value(s) as the maximum number of CBG(s), and/or the fourth certain value(s) as the number of CB(s) within the TB. Also, in a case that the random access response grant is used for scheduling of the PUSCH (i.e., scheduling of the Msg.3 transmission in the random access procedure), the UE 102 may assume the third certain value(s) as the maximum number of CBG(s), and/or the fourth certain value(s) as the number of CB(s) within the TB.

Here, in a case that the second information is not configured and/or the third information is not configured, the UE 102 may assume the third certain value(s) as the maximum number (N) of CBG(s). Namely, in a case that the maximum number (N) of CBG(s) is not configured and/or the number (C) of CB(s) within the TB is not configured, the UE 102 may assume the third certain value(s) as the maximum number (N) of CBG(s). Also, in a case that the second information is not configured and/or the third information is not configured, the UE 102 may assume the fourth certain value(s) as the number (C) of CB(s) within the TB. Namely, in a case that the maximum number (N) of CBG(s) is not configured and/or the number (C) of CB(s) within the TB is not configured, the UE 102 may assume the fourth certain value(s) as the number (C) of CB(s) within the TB. Namely, in a case that the second information is not configured and/or the third information is not configured, the UE 102 may assume the third certain value(s) as the maximum number (N) of CBG(s), and/or the fourth certain value(s) as the number (C) of CB(s) within the TB.

Namely, in a case that the second information is not configured and/or the third information is not configured, the number (M) of CBG(s) in the TB may be assumed as (e.g., considered as, specified as, and/or determined based on) the third certain value(s) and/or the fourth certain value(s). Also, in a case that the second information is not configured and/or the third information is not configured, the size of the HARQ-ACK codebook size may assumed as (e.g., considered as, specified as, and/or determined based on) the third certain value(s) and/or the fourth certain value(s). Also, in a case that the second information is not configured and/or the third information is not configured, the number of bits of the preempted indication included in the DCI format (e.g., the DCI format C) may be assumed as (e.g., considered as, specified as, and/or determined based on) the third certain value(s) and/or the fourth certain value(s). Also, in a case that the second information is not configured and/or the third information is not configured, the number of bits of the CBGTI included in the DCI format (e.g., the DCI format A, the DCI format B, and/or the DCI format C) may be assumed as (e.g., considered as, specified as, and/or determined based on) the third certain value(s) and/or the fourth certain value(s). Also, in a case that the second information is not configured and/or the third information is not configured, the number of bits of the CBGFI included in the DCI format (e.g., the DCI format A, the DCI format B, and/or the DCI format C) may be assumed as (e.g., considered as, specified as, and/or determined based on) the third certain value(s) and/or the fourth certain value(s). Namely, in a case that the second information is not configured and/or the third information is not configured, the UE 102 may assume the CBG(s)-based transmission is not applied for the PDSCH transmission(s) (i.e., the PDSCH transmission(s) does not include the CBG(s) (e.g., the CBG(s) transmission(s)). Namely, in a case that the second information is not configured and/or the third information is not configured, the UE 102 may assume the TB-based transmission is always applied for the PDSCH transmission(s) (i.e., the PDSCH transmission(s) includes the TB (e.g., the TB transmission(s)).

Here, each of the certain value(s) (i.e., the first certain value(s), the second certain value(s), the third certain value(s), the fourth certain value(s), and/or the fifth certain value(s)) may be defined, in advance, by the specification, and may be known information between the gNB 160 and the UE 102. Namely, the each of the certain value(s) may be a predetermined value(s). Here, the gNB 160 may transmit, by using the RRC message, each of information used for configuring the each of the certain value(s). Namely, the UE 102 may determine the each of the certain value(s) based on the each of information that is configured by the gNB 160.

As described above, some methods for the PSCH transmission (e.g., the PDSCH transmission and/or the PUSCH transmission) may be applied (e.g., specified). Here, the combination of one or more of the some methods described above may be applied for the PSCH transmission (e.g., the PDSCH transmission and/or the PUSCH transmission).

Figure 9:
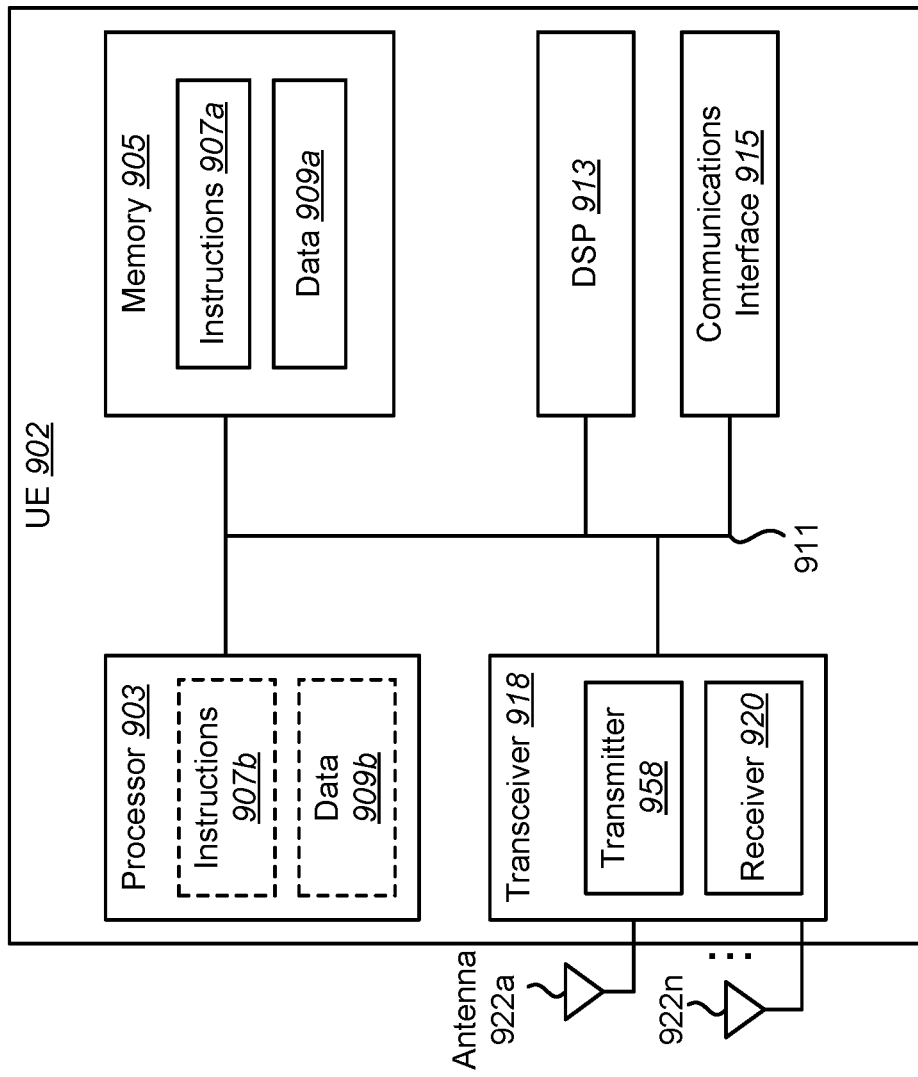
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1. The UE 902 includes a processor 903 that controls operation of the UE 902. The processor 903 may also be referred to as a central processing unit (CPU). Memory 905, which may include read-only memory (ROM), random access memory (RAM), a combination of the two or any type of device that may store information, provides instructions 907*a* and data 909*a* to the processor 903. A portion of the memory 905 may also include non-volatile random access memory (NVRAM). Instructions 907*b* and data 909*b* may also reside in the processor 903. Instructions 907*b* and/or data 909*b* loaded into the processor 903 may also include instructions 907*a* and/or data 909*a* from memory 905 that were loaded for execution or processing by the processor 903. The instructions 907*b* may be executed by the processor 903 to implement the methods described above.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922*a-n* are attached to the housing and electrically coupled to the transceiver 918.

The various components of the UE 902 are coupled together by a bus system 911, which may include a power bus, a control signal bus and a status signal bus, in addition to a data bus. However, for the sake of clarity, the various buses are illustrated in FIG. 9 as the bus system 911. The UE 902 may also include a digital signal processor (DSP) 913 for use in processing signals. The UE 902 may also include a communications interface 915 that provides user access to the functions of the UE 902. The UE 902 illustrated in FIG. 9 is a functional block diagram rather than a listing of specific components.

Figure 10:
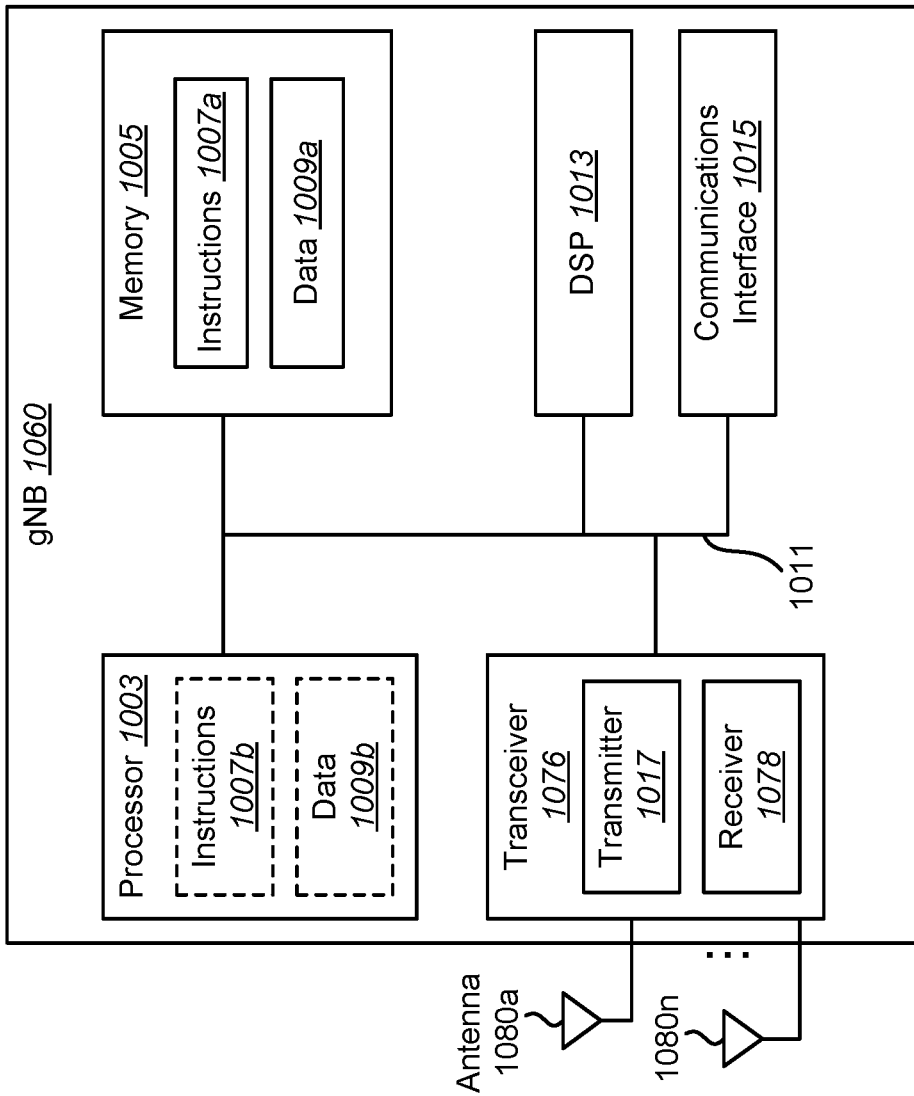
FIG. 10 illustrates various components that may be utilized in a gNB.

FIG. 10 illustrates various components that may be utilized in a gNB 1060. The gNB 1060 described in connection with FIG. 10 may be implemented in accordance with the gNB 160 described in connection with FIG. 1. The gNB 1060 includes a processor 1003 that controls operation of the gNB 1060. The processor 1003 may also be referred to as a central processing unit (CPU). Memory 1005, which may include read-only memory (ROM), random access memory (RAM), a combination of the two or any type of device that may store information, provides instructions 1007*a* and data 1009*a* to the processor 1003. A portion of the memory 1005 may also include non-volatile random access memory (NVRAM). Instructions 1007*b* and data 1009*b* may also reside in the processor 1003. Instructions 1007*b* and/or data 1009*b* loaded into the processor 1003 may also include instructions 1007*a* and/or data 1009*a* from memory 1005 that were loaded for execution or processing by the processor 1003. The instructions 1007*b* may be executed by the processor 1003 to implement the methods described above.

The gNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080*a-n* are attached to the housing and electrically coupled to the transceiver 1076.

The various components of the gNB 1060 are coupled together by a bus system 1011, which may include a power bus, a control signal bus and a status signal bus, in addition to a data bus. However, for the sake of clarity, the various buses are illustrated in FIG. 10 as the bus system 1011. The gNB 1060 may also include a digital signal processor (DSP) 1013 for use in processing signals. The gNB 1060 may also include a communications interface 1015 that provides user access to the functions of the gNB 1060. The gNB 1060 illustrated in FIG. 10 is a functional block diagram rather than a listing of specific components.

Figure 11:
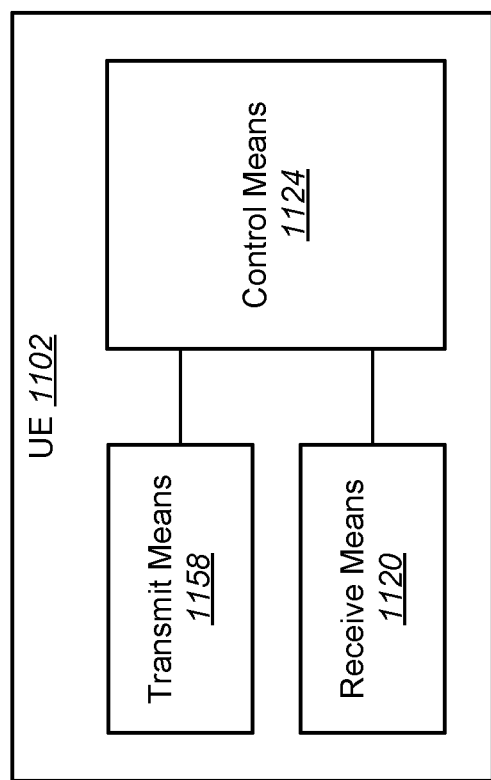
FIG. 11 is a block diagram illustrating one implementation of a UE in which systems and methods for downlink and/or uplink (re)transmissions may be implemented.

FIG. 11 is a block diagram illustrating one implementation of a UE 1102 in which systems and methods for downlink and/or uplink (re)transmissions may be implemented. The UE 1102 includes transmit means 1158, receive means 1120 and control means 1124. The transmit means 1158, receive means 1120 and control means 1124 may be configured to perform one or more of the functions described in connection with FIG. 1 above. FIG. 9 above illustrates one example of a concrete apparatus structure of FIG. 11. Other various structures may be implemented to realize one or more of the functions of FIG. 1. For example, a DSP may be realized by software.

Figure 12:
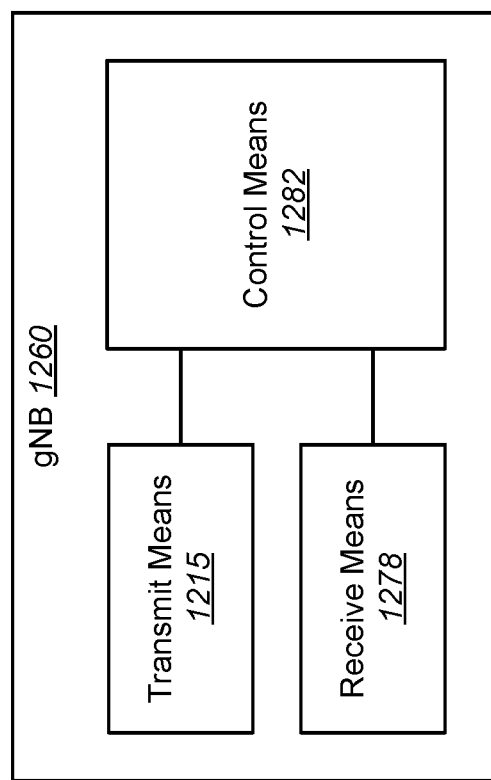
FIG. 12 is a block diagram illustrating one implementation of a gNB in which systems and methods for downlink and/or uplink (re)transmissions may be implemented.

FIG. 12 is a block diagram illustrating one implementation of a gNB 1260 in which systems and methods for downlink and/or uplink (re)transmissions may be implemented. The gNB 1260 includes transmit means 1217, receive means 1278 and control means 1282. The transmit means 1217, receive means 1278 and control means 1282 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
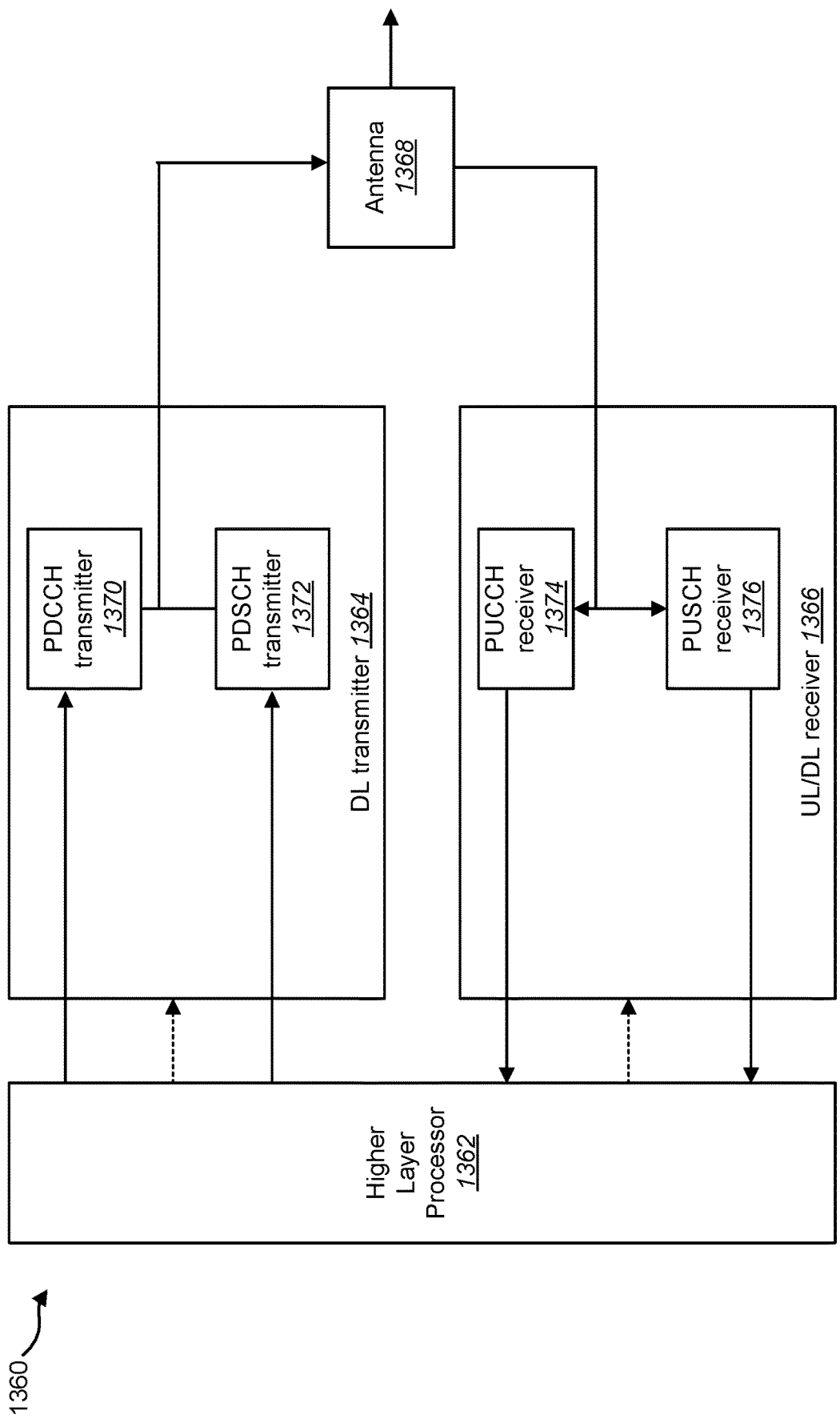
FIG. 13 is a block diagram illustrating one implementation of a gNB.

FIG. 13 is a block diagram illustrating one implementation of a gNB 1360. The gNB 1360 may include a higher layer processor 1362, a DL transmitter 1364, a UL receiver 1366 and antennas 1368. The DL transmitter 1364 may include a PDCCH transmitter 1370 and a PDSCH transmitter 1372. The UL receiver 1366 may include a PUCCH receiver 1374 and a PUSCH receiver 1376. The higher layer processor 1362 may manage physical layer's behaviors (the DL transmitter's and the UL receiver's behaviors) and provide higher layer parameters to the physical layer. The higher layer processor 1362 may obtain transport blocks from the physical layer. The higher layer processor 1362 may send/acquire higher layer messages such as an RRC message and MAC message to/from a UE's higher layer. The higher layer processor 1362 may provide the PDSCH transmitter 1372 transport blocks and provide the PDCCH transmitter 1370 transmission parameters related to the transport blocks. The UL receiver 1366 may receive multiplexed uplink physical channels and uplink physical signals via receiving antennas and de-multiplex them. The PUCCH receiver 1374 may provide the higher layer processor UCI. The PUSCH receiver 1376 may provide the higher layer processor 1362 received transport blocks.

Figure 14:
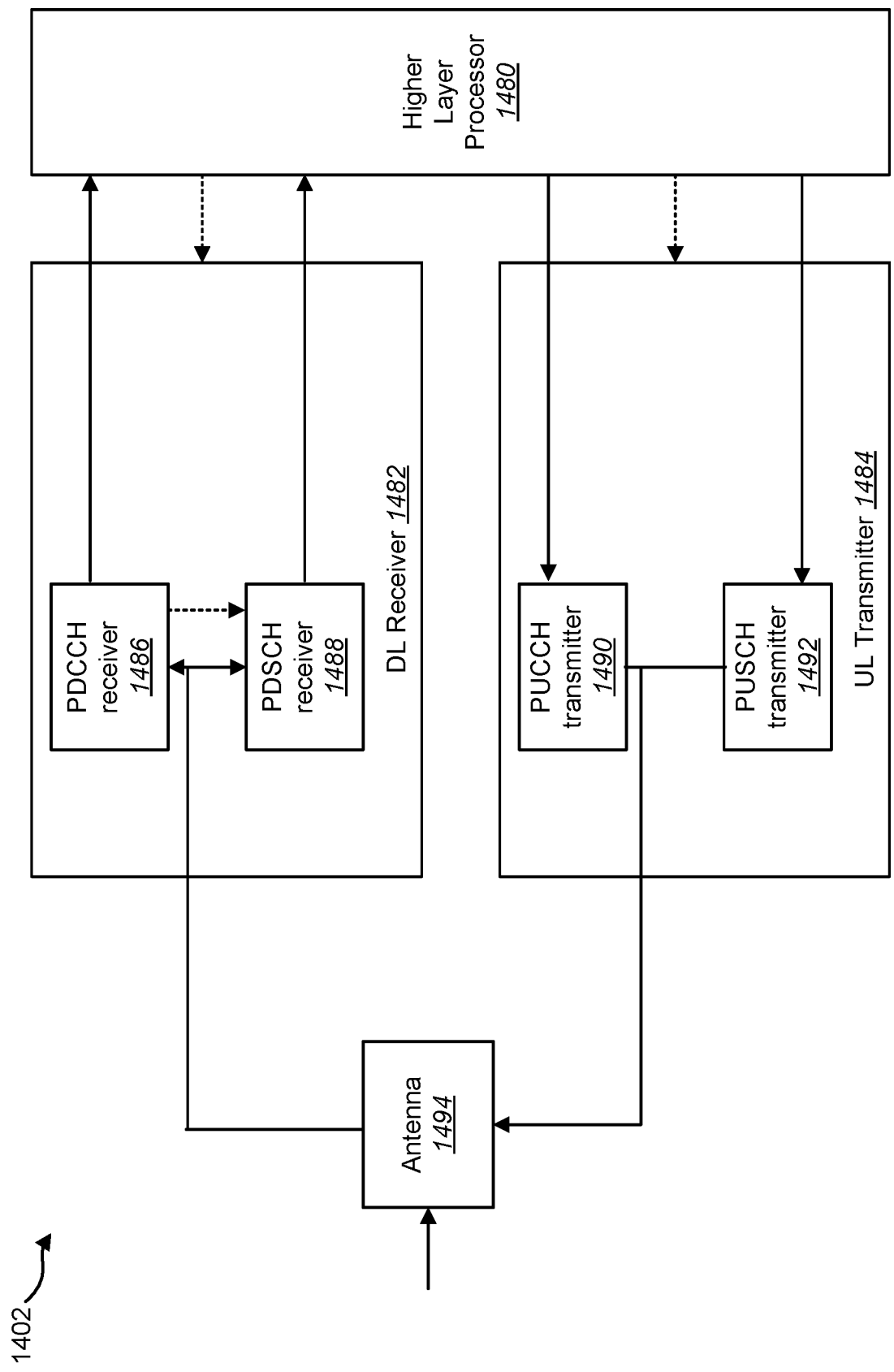
FIG. 14 is a block diagram illustrating one implementation of a UE.

FIG. 14 is a block diagram illustrating one implementation of a UE 1402. The UE 1402 may include a higher layer processor 1480, a UL transmitter 1484, a DL receiver 1482 and antennas 1494. The UL transmitter 1484 may include a PUCCH transmitter 1490 and a PUSCH transmitter 1492. The DL receiver 1482 may include a PDCCH receiver 1486 and a PDSCH receiver 1488. The higher layer processor 1480 may manage physical layer's behaviors (the UL transmitter's and the DL receiver's behaviors) and provide higher layer parameters to the physical layer. The higher layer processor 1480 may obtain transport blocks from the physical layer. The higher layer processor 1480 may send/acquire higher layer messages such as an RRC message and MAC message to/from a UE's higher layer. The higher layer processor 1480 may provide the PUSCH transmitter transport blocks and provide the PUCCH transmitter UCI. The DL receiver 1482 may receive multiplexed downlink physical channels and downlink physical signals via receiving antennas and de-multiplex them. The PDCCH receiver 1486 may provide the higher layer processor DCI. The PDSCH receiver 1488 may provide the higher layer processor 1480 received transport blocks.

Figure 15:
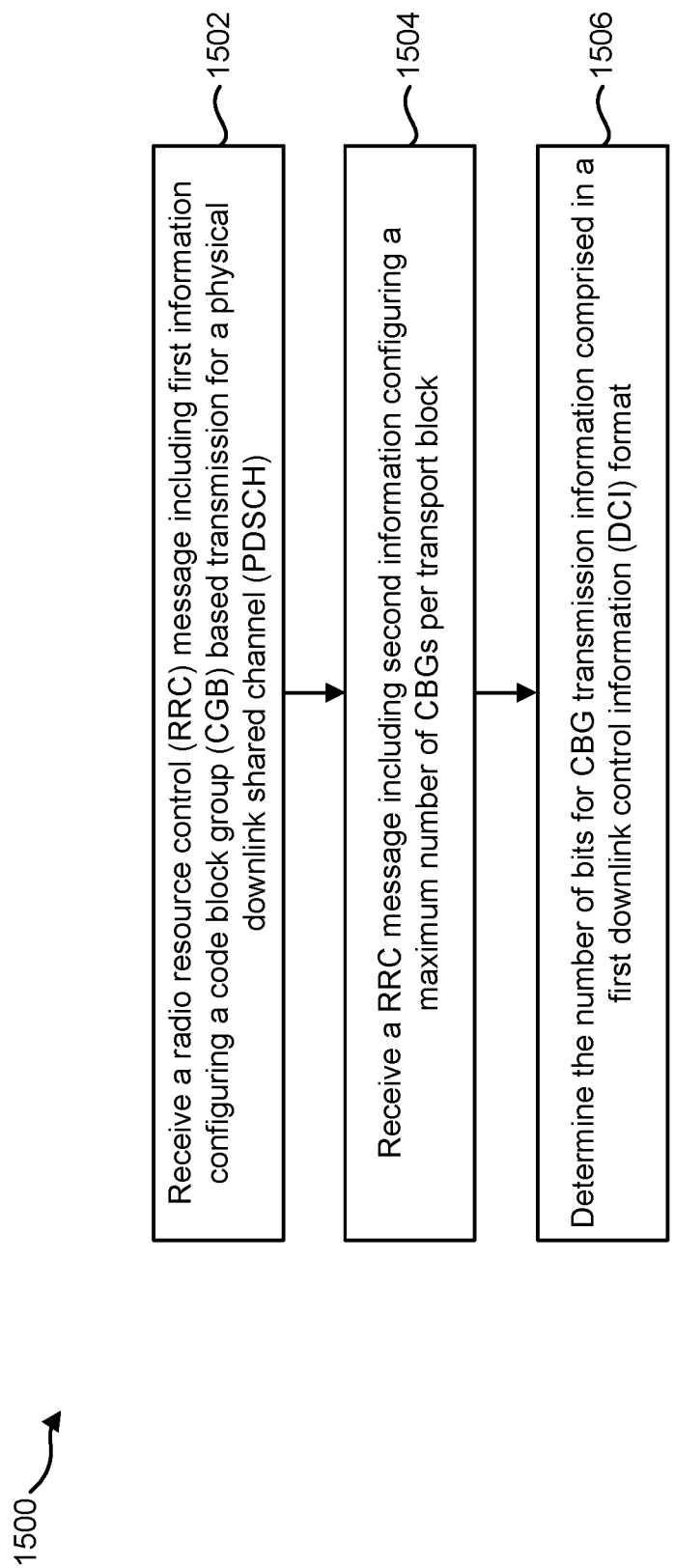
FIG. 15 is a flow diagram of one example of a communication method of a user equipment that communicates with a base station apparatus.

FIG. 15 is a flow diagram of one example of a communication method 1500 of a user equipment 102 that communicates with a base station apparatus on serving cells having a primary cell and one or more secondary cells. A radio resource control (RRC) message is received 1502 having first information configuring a code block group (CGB) based transmission for a physical downlink shared channel (PDSCH). A RRC message is received 1504 having second information configuring a maximum number of CBGs per transport block. The number of bits is determined 1506 for CBG transmission information comprised in a first downlink control information (DCI) format, wherein the first DCI format may be used for scheduling of the PDSCH.

In a case that the first information is configured, the number of bits for the CBG transmission information comprised in the first DCI format may be determined based on the second information. The first information and the second information may be configured for each of the primary cell and the one or more secondary cells. Cyclic redundancy check (CRC) scrambled by a cell-radio network temporary identifier (C-RNTI) may be attached to the first DCI format.

A RRC message may be receiving having third information configuring whether a CBG flush indicator is present in the first DCI format. In a case that the CBG flush indicator is present in the first DCI format, the number of the CBG flush indicator may always be 1 bit.

The method 1500 may further include transmitting hybrid automatic repeat request-acknowledgment (HARQ-ACK) for the CBG based transmission for the PDSCH scheduled by using the first DCI format, and receiving a RRC message comprising third information configuring a second DCI format used for scheduling of the PDSCH. In a case that the PDSCH scheduled by using the second DCI format is received, the transmitting circuitry may be configured to transmit HARQ-ACK only for a transport block.

The communication method 1500 may further include receiving a radio resource control (RRC) message including third information configuring a code block group (CGB) based transmission for a physical up shared channel (PUSCH). A RRC message may be received having fourth information configuring a maximum number of CBGs per transport block. The number of bits may be determined for CBG transmission information comprised in a third DCI format, wherein the third DCI format may be used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

Figure 16:
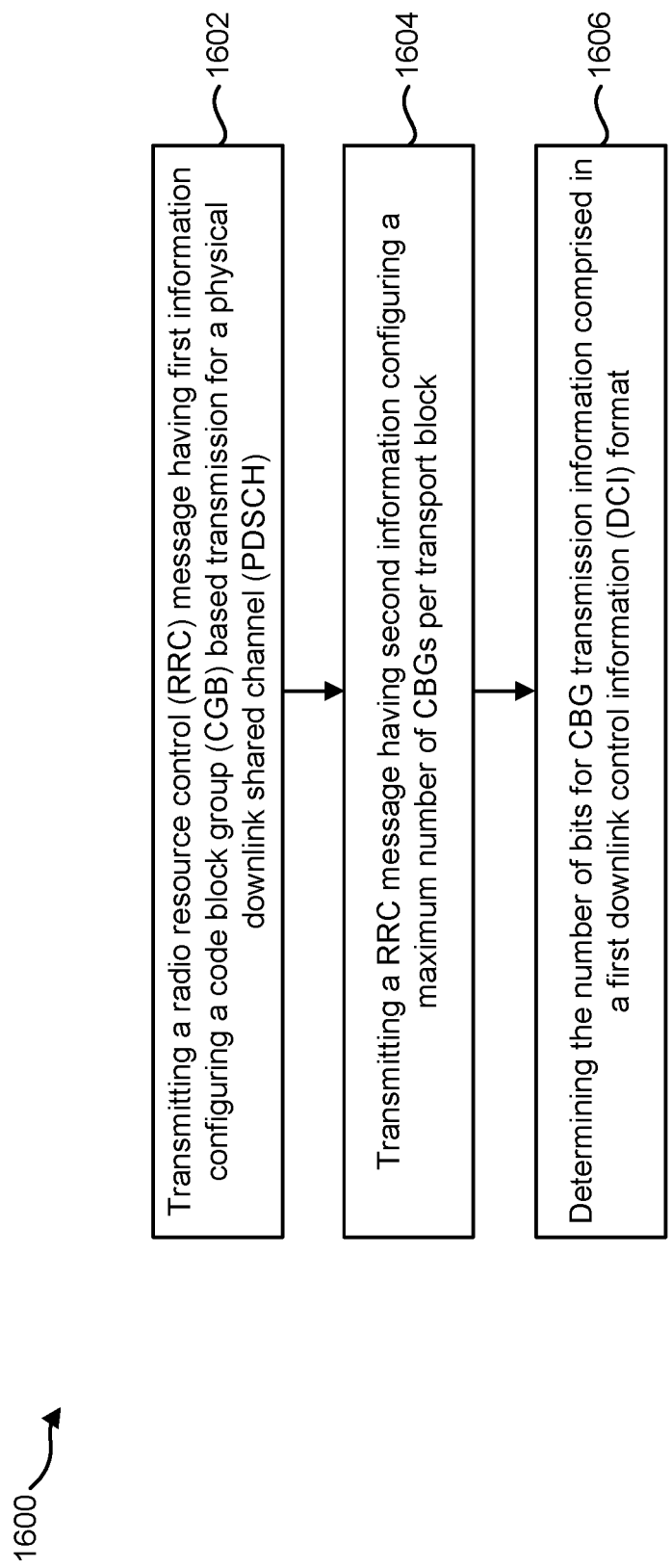
FIG. 16 is a flow diagram of one example of a communication method of a base station apparatus that communicates with a UE on serving cells having a primary cell and one or more secondary cells.

FIG. 16 is a flow diagram of one example of a communication method 1600 of a base station apparatus 160 that communicates with a user equipment (UE) 102 on serving cells having a primary cell and one or more secondary cells. A radio resource control (RRC) message is transmitted 1602 having first information configuring a code block group (CGB) based transmission for a physical downlink shared channel (PDSCH). A RRC message is transmitted 1604 having second information configuring a maximum number of CBGs per transport block. The number of bits is determined 1606 for CBG transmission information comprised in a first downlink control information (DCI) format, wherein the first DCI format may be used for scheduling of the PDSCH. In a case that the first information is configured, the number of bits for the CBG transmission information comprised in the first DCI format may be determined based on the second information. The first information and the second information may be configured for each of the primary cell and the one or more secondary cells. Cyclic redundancy check (CRC) scrambled by a cell-radio network temporary identifier (C-RNTI) may be attached to the first DCI format.

A RRC message may be transmitted having third information configuring whether a CBG flush indicator is present in the first DCI format. In a case that the CBG flush indicator is present in the first DCI format, the number of the CBG flush indicator may always be 1 bit.

A hybrid automatic repeat request-acknowledgment (HARQ-ACK) may be received for the CBG based transmission for the PDSCH scheduled by using the first DCI format. A RRC message may be transmitted having third information configuring a second DCI format used for scheduling of the PDSCH. In a case that the PDSCH scheduled by using the second DCI format is transmitted, the receiving circuitry may be configured to receive HARQ-ACK only for a transport block.

The communication method 1600 may further include transmitting a radio resource control (RRC) message having third information configuring a code block group (CGB) based transmission for a physical up shared channel (PUSCH). The method 1600 may include transmitting a RRC message including fourth information configuring a maximum number of CBGs per transport block. The number of bits may be determined for CBG transmission information comprised in a third DCI format, wherein the third DCI format may be used for scheduling of the PUSCH. In a case that the third information is configured, the number of bits for the CBG transmission comprised in the third DCI format may be determined based on the fourth information. The third information and the fourth information may be configured for each of the primary cell and the one or more secondary cells. Cyclic redundancy check (CRC) scrambled by a cell-radio network temporary identifier (C-RNTI) may be attached to the third DCI format.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) that communicates with a base station apparatus on serving cells comprising a primary cell and one or more secondary cells, comprising:

receiving circuitry configured to receive, a radio resource control (RRC) message comprising first information configuring a code block group (CGB) based transmission for a physical downlink shared channel (PDSCH), the receiving circuitry configured to receive, a RRC message comprising second information configuring a maximum number of CBGs per transport block, the receiving circuitry configured to receive, a RRC message comprising third information configuring whether a CBG flush indicator is present in the first DCI format, wherein in a case that the CBG flush indicator is present in the first DCI format, the number of the CBG flush indicator is always 1 bit, and processing circuitry configured to determine the number of bits for CBG transmission information comprised in a first downlink control information (DCI) format, the first DCI format being used for scheduling of the PDSCH, wherein in a case that the first information is configured, the number of bits for the CBG transmission information comprised in the first DCI format is determined based on the second information, the first information and the second information are configured for each of the primary cell and the one or more secondary cells, and cyclic redundancy check (CRC) scrambled by a cell-radio network temporary identifier (C-RNTI) is attached to the first DCI format.

2. The UE according to claim 1, further comprising:

transmitting circuitry configured to transmit, hybrid automatic repeat request-acknowledgment (HARQ-ACK) for the CBG based transmission for the PDSCH scheduled by using the first DCI format, wherein the receiving circuitry is configured to receive, a RRC message comprising third information configuring a second DCI format used for scheduling of the PDSCH, and in a case that the PDSCH scheduled by using the second DCI format is received, the transmitting circuitry is configured to transmit, HARQ-ACK only for a transport block.

3. The UE according to claim 1, wherein the receiving circuitry is configured to receive, a radio resource control (RRC) message comprising third information configuring a code block group (CGB) based transmission for a physical up shared channel (PUSCH), the receiving circuitry is configured to receive, a RRC message comprising fourth information configuring a maximum number of CBGs per transport block, the processing circuitry is configured to determine the number of bits for CBG transmission information comprised in a third DCI format, the third DCI format being used for scheduling of the PUSCH, in a case that the third information is configured, the number of bits for the CBG transmission comprised in the third DCI format is determined based on the fourth information, the third information and the fourth information are configured for each of the primary cell and the one or more secondary cells, and cyclic redundancy check (CRC) scrambled by a cell-radio network temporary identifier (C-RNTI) is attached to the third DCI format.

4. A base station apparatus that communicates with a user equipment (UE) on serving cells comprising a primary cell and one or more secondary cells, comprising:

transmitting circuitry configured to transmit, a radio resource control (RRC) message comprising first information configuring a code block group (CGB) based transmission for a physical downlink shared channel (PDSCH), the transmitting circuitry configured to transmit, a RRC message comprising second information configuring a maximum number of CBGs per transport block, the transmitting circuitry configured to transmit, a RRC message comprising third information configuring whether a CBG flush indicator is present in the first DCI format, wherein in a case that the CBG flush indicator is present in the first DCI format, the number of the CBG flush indicator is always 1 bit, and processing circuitry configured to determine the number of bits for CBG transmission information comprised in a first downlink control information (DCI) format, the first DCI format being used for scheduling of the PDSCH, wherein in a case that the first information is configured, the number of bits for the CBG transmission information comprised in the first DCI format is determined based on the second information, the first information and the second information are configured for each of the primary cell and the one or more secondary cells, and cyclic redundancy check (CRC) scrambled by a cell-radio network temporary identifier (C-RNTI) is attached to the first DCI format.

5. The base station apparatus according to claim 4, further comprising:

receiving circuitry configured to receive, hybrid automatic repeat request-acknowledgment (HARQ-ACK) for the CBG based transmission for the PDSCH scheduled by using the first DCI format, wherein the transmitting circuitry is configured to transmit, a RRC message comprising third information configuring a second DCI format used for scheduling of the PDSCH, and in a case that the PDSCH scheduled by using the second DCI format is transmitted, the receiving circuitry is configured to receive, HARQ-ACK only for a transport block.

6. The base station apparatus according to claim 4, wherein the transmitting circuitry is configured to transmit, a radio resource control (RRC) message comprising third information configuring a code block group (CGB) based transmission for a physical up shared channel (PUSCH), the transmitting circuitry is configured to transmit, a RRC message comprising fourth information configuring a maximum number of CBGs per transport block, the processing circuitry is configured to determine the number of bits for CBG transmission information comprised in a third DCI format, the third DCI format being used for scheduling of the PUSCH, in a case that the third information is configured, the number of bits for the CBG transmission comprised in the third DCI format is determined based on the fourth information, the third information and the fourth information are configured for each of the primary cell and the one or more secondary cells, and cyclic redundancy check (CRC) scrambled by a cell-radio network temporary identifier (C-RNTI) is attached to the third DCI format.

7. A communication method of a user equipment that communicates with a base station apparatus on serving cells comprising a primary cell and one or more secondary cells, comprising:

receiving, a radio resource control (RRC) message comprising first information configuring a code block group (CGB) based transmission for a physical downlink shared channel (PDSCH), receiving, a RRC message comprising second information configuring a maximum number of CBGs per transport block, receiving, a RRC message comprising third information configuring whether a CBG flush indicator is present in the first DCI format, wherein in a case that the CBG flush indicator is present in the first DCI format, the number of the CBG flush indicator is always 1 bit, and determining the number of bits for CBG transmission information comprised in a first downlink control information (DCI) format, the first DCI format being used for scheduling of the PDSCH, wherein in a case that the first information is configured, the number of bits for the CBG transmission information comprised in the first DCI format is determined based on the second information, the first information and the second information are configured for each of the primary cell and the one or more secondary cells, and cyclic redundancy check (CRC) scrambled by a cell-radio network temporary identifier (C-RNTI) is attached to the first DCI format.

8. The communication method according to claim 7, further comprising:

transmitting, hybrid automatic repeat request-acknowledgment (HARQ-ACK) for the CBG based transmission for the PDSCH scheduled by using the first DCI format, and receiving, a RRC message comprising third information configuring a second DCI format used for scheduling of the PDSCH, wherein in a case that the PDSCH scheduled by using the second DCI format is received, the transmitting circuitry is configured to transmit, HARQ-ACK only for a transport block.

9. The communication method according to claim 7, further comprising:

receiving, a radio resource control (RRC) message comprising third information configuring a code block group (CGB) based transmission for a physical up shared channel (PUSCH), receiving, a RRC message comprising fourth information configuring a maximum number of CBGs per transport block, and determining the number of bits for CBG transmission information comprised in a third DCI format, the third DCI format being used for scheduling of the PUSCH, wherein in a case that the third information is configured, the number of bits for the CBG transmission comprised in the third DCI format is determined based on the fourth information, the third information and the fourth information are configured for each of the primary cell and the one or more secondary cells, and cyclic redundancy check (CRC) scrambled by a cell-radio network temporary identifier (C-RNTI) is attached to the third DCI format.

10. A communication method of a base station apparatus that communicates with a user equipment (UE) on serving cells comprising a primary cell and one or more secondary cells, comprising:

transmitting, a radio resource control (RRC) message comprising first information configuring a code block group (CGB) based transmission for a physical downlink shared channel (PDSCH), transmitting, a RRC message comprising second information configuring a maximum number of CBGs per transport block, transmitting, a RRC message comprising third information configuring whether a CBG flush indicator is present in the first DCI format, wherein in a case that the CBG flush indicator is present in the first DCI format, the number of the CBG flush indicator is always 1 bit, and determining the number of bits for CBG transmission information comprised in a first downlink control information (DCI) format, the first DCI format being used for scheduling of the PDSCH, wherein in a case that the first information is configured, the number of bits for the CBG transmission information comprised in the first DCI format is determined based on the second information, the first information and the second information are configured for each of the primary cell and the one or more secondary cells, and cyclic redundancy check (CRC) scrambled by a cell-radio network temporary identifier (C-RNTI) is attached to the first DCI format.

11. The communication method according to claim 10, further comprising:

receiving, hybrid automatic repeat request-acknowledgment (HARQ-ACK) for the CBG based transmission for the PDSCH scheduled by using the first DCI format, and transmitting, a RRC message comprising third information configuring a second DCI format used for scheduling of the PDSCH, wherein in a case that the PDSCH scheduled by using the second DCI format is transmitted, the receiving circuitry is configured to receive, HARQ-ACK only for a transport block.

12. The communication method according to claim 10, further comprising:

transmitting, a radio resource control (RRC) message comprising third information configuring a code block group (CGB) based transmission for a physical up shared channel (PUSCH), transmitting, a RRC message comprising fourth information configuring a maximum number of CBGs per transport block, determining the number of bits for CBG transmission information comprised in a third DCI format, the third DCI format being used for scheduling of the PUSCH, wherein in a case that the third information is configured, the number of bits for the CBG transmission comprised in the third DCI format is determined based on the fourth information, the third information and the fourth information are configured for each of the primary cell and the one or more secondary cells, and cyclic redundancy check (CRC) scrambled by a cell-radio network temporary identifier (C-RNTI) is attached to the third DCI format.

* * * * *

UNITED STATES PATENT AND TRADEMARK OFFICE
CERTIFICATE OF CORRECTION

PATENT NO. : 10,673,566 B2  
APPLICATION NO. : 16/123477  
DATED : June 2, 2020  
INVENTOR(S) : Tatsushi Aiba et al.

Page 1 of 1

It is certified that error appears in the above-identified patent and that said Letters Patent is hereby corrected as shown below:

In the Claims

In Column 40, Line 51 please delete "(CGB)" and replace it with --(CBG)--.
In Column 41, Line 28 please delete "(CGB)" and replace it with --(CBG)--.
In Column 41, Line 53 please delete "(CGB)" and replace it with --(CBG)--.
In Column 42, Line 33 please delete "(CGB)" and replace it with --(CBG)--.
In Column 42, Line 60 please delete "(CGB)" and replace it with --(CBG)--.
In Column 43, Line 35 please delete "(CGB)" and replace it with --(CBG)--.
In Column 43, Line 60 please delete "(CGB)" and replace it with --(CBG)--.
In Column 44, Line 41 please delete "(CGB)" and replace it with --(CBG)--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*